United States Patent
Choi et al.

(10) Patent No.: US 12,486,994 B2
(45) Date of Patent: Dec. 2, 2025

(54) AIR CONDITIONER AND OPERATION METHOD THEREOF

(71) Applicant: LG ELECTRONICS INC., Seoul (KR)

(72) Inventors: Changmin Choi, Seoul (KR); Juntae Kim, Seoul (KR); Soonyong Choi, Seoul (KR); Hyuntak Lee, Seoul (KR); Daewoo Kim, Seoul (KR); Jinsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 495 days.

(21) Appl. No.: 17/958,643

(22) Filed: Oct. 3, 2022

(65) Prior Publication Data
US 2023/0116355 A1    Apr. 13, 2023

(30) Foreign Application Priority Data

Oct. 7, 2021 (KR) .................. 10-2021-0133404

(51) Int. Cl.
*F24F 11/46* (2018.01)
*F24F 11/64* (2018.01)
*G05B 13/02* (2006.01)

(52) U.S. Cl.
CPC .............. *F24F 11/46* (2018.01); *F24F 11/64* (2018.01); *G05B 13/0265* (2013.01)

(58) Field of Classification Search
CPC . F24F 11/46; F24F 11/64; F24F 11/86; G05B 13/0265; C12N 9/12; C12Q 1/6883; C12Q 2600/112; C12Q 2600/156
See application file for complete search history.

(56) References Cited

U.S. PATENT DOCUMENTS

2011/0302301 A1*  12/2011  Lowes .................. G06F 9/5083
                                                                    709/224
2016/0218507 A1*   7/2016  Maeda .................... H02J 3/008
(Continued)

FOREIGN PATENT DOCUMENTS

JP       2012191717       *  9/2011  ................ H02J 3/00
KR  10-2020-0089196           7/2020
(Continued)

OTHER PUBLICATIONS

European Search Report dated Feb. 20, 2023 issued in Application No. 22199934.5.

*Primary Examiner* — Tameem D Siddiquee
(74) *Attorney, Agent, or Firm* — KED & ASSOCIATES, LLP

(57) ABSTRACT

Disclosed is an air conditioner. The air conditioner includes: an outdoor unit having therein a compressor for compressing refrigerant; at least one indoor unit; a storage configured to store a database on a power quantity used by the air conditioner; and a controller. The controller is configured to: based on the database, calculate an estimated power quantity expected to be used by the air conditioner for at least a part of an entire period, based on a preset maximum power quantity for the entire period and the calculated estimated power quantity, determine a target power quantity for a specific unit time, which is expected to be used by the air conditioner for the specific unit time of the entire period; control the compressor for the specific unit time based on the target power quantity; and in response to arrival of a point in time to update the target power quantity, add, to the database, the power quantity used by the air conditioner for the specific unit time.

18 Claims, 15 Drawing Sheets

(56) References Cited

U.S. PATENT DOCUMENTS

2016/0329706 A1* 11/2016 Deligiannis .......... G05B 13/026
2019/0258237 A1* 8/2019 Buda ........................ F24F 11/49
2020/0326676 A1* 10/2020 Perez ................... G05B 13/041
2022/0349603 A1* 11/2022 Motodani ................ F24F 11/89

FOREIGN PATENT DOCUMENTS

KR   10-2021-0093666   7/2021
WO   WO 2015/025317   2/2015

* cited by examiner

FIG. 9A

| Mon | Tue | Wed | Thu | Fri | Sat | Sun |
|-----|-----|-----|-----|-----|-----|-----|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

| Mon | Tue | Wed | Thu | Fri | Sat | Sun | Estimated power quantity | Target power quantity |
|---|---|---|---|---|---|---|---|---|
|  |  | (1) 15kwh | 2 15kwh | 3 15kwh | 4 7kwh | 5 8kwh | 60kWh (10.9%) | 43.6kWh |
| 6 | 7 | 8 | 9 | 10 | 11 | 12 | 120kWh (21.8%) | 87.3kWh |
| 13 | 14 | 15 | 16 | 17 | 18 | 19 | 130kWh (23.6%) | 94.6kWh |
| 20 | 21 | 22 | 23 | 24 | 25 | 26 | 140kWh (25.4%) | 101.6kWh |
| 27 | 28 | 29 | 30 | 31 |  |  | 100kWh (18.1%) | 72.8kWh |

FIG. 9C

| Mon | Tue | Wed | Thu | Fri | Sat | Sun | Estimated power quantity | Target power quantity |
|---|---|---|---|---|---|---|---|---|
| | | 1 | 2 | 3 | 4 | 5 | - | - |
| (6) | 7 | 8 | 9 | 10 | 11 | 12 | 124kWh (24.6%) | 87.3kWh |
| 21kwh | 21kwh | 21kwh | 21kwh | 21kwh | 9kwh | 10kwh | | |
| 13 | 14 | 15 | 16 | 17 | 18 | 19 | 135kWh (26.8%) | 95.1kWh |
| 20 | 21 | 22 | 23 | 24 | 25 | 26 | 145kWh (28.8%) | 102.2kWh |
| 27 | 28 | 29 | 30 | 31 | | | 101kWh (20.0%) | 71kWh |

| Mon | Tue | Wed | Thu | Fri | Sat | Sun | Estimated power quantity | Target power quantity |
|---|---|---|---|---|---|---|---|---|
| | | 1 | 2 | 3 | 4 | 5 | - | - |
| 6 | 7 | 8 | (9) | 10 | 11 | 12 | 124kWh (24.6%) | 87.3kWh |
| - | - | - | 23kwh | 23kwh | 9kwh | 10kwh | | |
| 13 | 14 | 15 | 16 | 17 | 18 | 19 | 135kWh (26.8%) | 95.1kWh |
| 20 | 21 | 22 | 23 | 24 | 25 | 26 | 145kWh (28.8%) | 102.2kWh |
| 27 | 28 | 29 | 30 | 31 | | | 101kWh (20.0%) | 71kWh |

AIR CONDITIONER AND OPERATION METHOD THEREOF

CROSS-REFERENCE TO RELATED APPLICATION(S)

This application claims priority under 35 U.S.C. § 119 to Korean Application No. KR 10-2021-0133404 filed in Korea on Oct. 7, 2021, whose entire disclosure(s) is/are hereby incorporated by reference.

BACKGROUND

1. Field

The present disclosure relates to an air conditioner and an operation method thereof, and more particularly, to an air conditioner capable of limiting a power quantity to be used for an entire predetermined period to a target value or less, and an operation method thereof.

2. Background

An air conditioner is installed to provide a more comfortable interior environment for humans by discharging cold or warm air into an indoor space to adjust the room temperature and purify the indoor air. Typically, the air conditioner includes an indoor unit composed of a heat exchanger and installed indoors, and an outdoor unit composed of a compressor, a heat exchanger, etc., and supplying refrigerant to the indoor unit.

The air conditioner is operated for cooling or heating according to a flow of refrigerant. During a cooling operation, high-temperature and high-pressure liquid refrigerant is supplied to the indoor unit from the compressor of the outdoor unit through the heat exchanger of the outdoor unit. As the refrigerant expands and is vaporized in the heat exchanger of the indoor unit, ambient temperature decreases, and as a fan of the indoor unit is rotated, cold air is discharged into the indoor space. During a heating operation, high-temperature and high-pressure gaseous refrigerant is supplied to the indoor unit from the compressor of the outdoor unit, and air heated by energy, which is released as the high-temperature and high-pressure gaseous refrigerant is liquefied in the heat exchanger of the indoor unit, is released into the indoor space according to an operation of the fan of the indoor unit.

In recent years, electronic devices used at home are increasingly diversified for convenience of users, and various automation systems are used to increase productivity in various industrial fields. In addition, as temperature gradually increases due to climate change such as global warming, the number and time of operations of an air conditioner are also gradually increasing. For these reasons, more and more power is consumed not only at home but also in entire industries, resulting in significant electricity bills.

Meanwhile, when desired to prevent an excessively large amount for electricity bills due to the air conditioner, a user continuously checks a power quantity consumed by the air conditioner to limit an operating time or cooling/heating capacity of the air conditioner to a certain extent. In this case, in order to check the power quantity consumed by the air conditioner, the user may repeatedly check a numerical value of a watt-hour meter provided at home or in a building or use a system for accumulatively managing a power quantity used by the air conditioner in conjunction with the watt-hour meter, as similarly as disclosed in Related Art 1 (Korean Patent Application Publication No. 10-2020-0089196). However, in this case, it is inconvenient for the user to check the power quantity of the air conditioner every time, and it is difficult to systematically manage and limit the power quantity consumed by the air conditioner despite the user's efforts.

In addition, in order to systematically manage and limit the power quantity consumed by the air conditioner, a method may be used for which the air conditioner sets a target value of power consumption for a predetermined period to calculate an electricity rate and, if an accumulated power quantity used by the air conditioner approaches the target value, automatically stops being operated or maintains a heating or cooling capacity to a minimum for the remaining period. However, even if the air conditioner is set to be restricted in operation as described above, there is still a problem in that a comfortable indoor environment cannot be provided to the user while the operation of the air conditioner is being restricted. However, even if the air conditioner is set to be restricted in operation as described above, there is still a problem in that a comfortable indoor environment cannot be provided to the user while the operation of the air conditioner is being restricted.

An aspect of the present disclosure provides a solution to address the above-described and other problems.

Another object of the present disclosure provide an air conditioner capable of limiting a power quantity used for an entire period to a target value or less while providing a comfortable indoor environment to a user as much as possible, and an operation method thereof.

Yet another aspect of the present disclosure provides an air conditioner capable of calculating a power quantity expected to be used for an entire period, and an operation method thereof.

Yet another aspect of the present disclosure provides an air conditioner capable of calculating a per-section power quantity expected to be used for each section of an entire period, and an operation method thereof.

Yet another aspect of the present disclosure provides an air conditioner capable of calculating a per-unit-time power quantity expected to be used for each unit time included in a specific section, and an operation method thereof.

Yet another aspect of the present disclosure provides an air conditioner capable of determining a maximum power quantity to be used for a section and/or a unit time based on a maximum power quantity available for an entire period and a power quantity expected to be used for the entire period, each section and/or each unit time, and an operation method thereof.

Yet another aspect of the present disclosure provides an air conditioner capable of manage a history about a power quantity usage by the air conditioner by updating a power quantity-related database based on a power quantity used for an entire period, each section and/or each unit time, and an operation method thereof.

Yet another aspect of the present disclosure provides an air conditioner capable of updating in detail a target value of a power quantity to be used for a remaining period of an entire period in consideration of a history about a power quantity usage by the air conditioner, and an operation method thereof.

Yet another aspect of the present disclosure provides an air conditioner capable of updating a per-section power quantity and/or a per-unit-time power quantity in consideration of a relationship between an entire period and/or a specific section and a specific unit time corresponding to a current point in time, and an operation method thereof.

Yet another aspect of the present disclosure provides an air conditioner capable of accurately correcting a control criterion for operation of each component in consideration of a difference between a maximum power quantity available for a specific unit time and a power quantity expected to be used for the specific unit time.

Yet another aspect of the present disclosure provides an air conditioner capable of correcting a control criterion for operation of each component in consideration of a difference between a maximum power quantity available for a specific unit time and a power quantity expected to be used for the specific unit time, and an operation method thereof.

The objects of the present disclosure are not limited to the objects mentioned above, and other objects not mentioned will be clearly understood by those skilled in the art from the following description.

In an aspect of the present disclosure, an air conditioner according to various embodiments of the present disclosure includes: an outdoor unit having therein a compressor for compressing refrigerant; at least one indoor unit; a storage configured to store a database on a power quantity used by the air conditioner; and a controller.

According to an embodiment of the present disclosure, the controller may be configured to, based on the database, calculate an estimated power quantity expected to be used by the air conditioner for at least a part of an entire period.

According to an embodiment of the present disclosure, the controller may be configured to, based on a preset maximum power quantity for the entire period and the calculated estimated power quantity, determine a target power quantity for a specific unit time, which is expected to be used by the air conditioner for the specific unit time of the entire period.

According to an embodiment of the present disclosure, the controller may be configured to control the compressor for the specific unit time based on the target power quantity.

According to an embodiment of the present disclosure, the controller may be configured to, in response to arrival of a point in time to update the target power quantity, add, to the database, the power quantity used by the air conditioner for the specific unit time.

According to an embodiment of the present disclosure, the controller may be configured to calculate an estimated per-unit-time power quantity for at least one unit time included in a specific section, the specific section including the specific unit time and included in the plurality of sections of the entire period.

According to an embodiment of the present disclosure, the controller may be configured to calculate an estimated per-section power quantity for at least one section including the specific section among the plurality of sections.

According to an embodiment of the present disclosure, the controller may be configured to, based on the maximum power quantity for the entire period and the estimated per-section power quantity, determine a target power quantity for the specific section.

According to an embodiment of the present disclosure, the controller may be configured to, based on the target power quantity for the specific section and the estimated per-unit-time power quantity, determine the target power quantity for the specific unit time.

According to an embodiment of the present disclosure, the controller may be configured to calculate the estimated per-section power quantity by using a double exponential smoothing method.

According to an embodiment of the present disclosure, the controller may be configured to calculate the estimated per-unit-time power quantity by using a triple exponential smoothing method.

According to an embodiment of the present disclosure, the controller may be configured to, in a case where the specific unit time is a first unit time of the specific section and not a first unit time of the entire period, calculate the estimated per-section power quantity for the specific section among the plurality of sections and for a section subsequent to the specific section.

According to an embodiment of the present disclosure, the controller may be configured to, in a case where the specific unit time is a first unit time of the specific section and not a first unit time of the entire period, re-determine the target power quantity with respect to the specific section in consideration of a power quantity used for the section prior to the specific section among the plurality of sections.

According to an embodiment of the present disclosure, the controller may be configured to, in a case where the specific unit time is neither a first unit time of the specific section nor a first unit time of the entire period, calculate the estimated power quantity for the specific unit time among the unit times included in the specific section and for a unit time subsequent to the specific unit time.

According to an embodiment of the present disclosure, the controller may be configured to, in a case where the specific unit time is neither a first unit time of the specific section nor a first unit time of the entire period, re-determine the target power quantity for the specific unit time in consideration of a power quantity used in a unit time prior to the specific unit time among the unit times included in the specific section.

According to an embodiment of the present disclosure, the controller may be configured to: based on a saving rate corresponding to a difference between the estimated power quantity and the target power quantity for the specific unit time, correct a preset control criterion for controlling the compressor; and control the compressor according to the corrected control criterion.

According to an embodiment of the present disclosure, the controller may be configured to correct the preset control criterion as a control criterion corresponding to the saving rate by using a correction algorithm previously learned through machine learning.

According to an embodiment of the present disclosure, the correction algorithm may include a k-nearest neighbor (k-NN) algorithm.

According to an embodiment of the present disclosure, the storage may further store a database on an operating time during which the air conditioner has operated.

According to an embodiment of the present disclosure, the controller may be configured to, based on the database on the operating time, calculate the operating time corresponding to the specific unit time.

According to an embodiment of the present disclosure, the controller may be configured to, update the correction algorithm based on a difference between the power quantity used by the air conditioner while controlling the compressor according to the corrected control criterion and the power quantity calculated based on the operating time.

According to an embodiment of the present disclosure, the controller may be configured to: configured to: control the compressor according to the preset control criterion for a preset initial time; and based on a power quantity used by the air conditioner for the initial time and the operating time, determine whether the estimated power quantity for the specific unit time exceeds a target power quantity for the specific unit time.

According to an embodiment of the present disclosure, the controller may be configured to correct the preset control criterion when the estimated power quantity for the specific unit time exceeds the target power quantity for the specific unit time.

In another aspect of the present disclosure, an operation method of an air conditioner may include, based on a database on a power quantity used by the air conditioner, calculating an estimated power quantity expected to be used by the air conditioner for at least a part of an entire period.

According to one embodiment of the present disclosure, the method may include based on a preset maximum power quantity for the entire period and the calculated estimated power quantity, determining a target power quantity for a specific unit time, which is expected to be used by the air conditioner for the specific unit time of the entire period.

According to an embodiment of the present disclosure, the method may include controlling the compressor for the specific unit time based on the target power quantity.

According to an embodiment of the present disclosure, the method may include in response to arrival of a point in time to update the target power quantity, adding, to the database, the power quantity used by the air conditioner for the specific unit time.

According to an embodiment of the present disclosure, the calculating of the estimated power quantity may include calculating an estimated per-unit-time power quantity for at least one unit time included in a specific section, the specific section including the specific unit time and included in the plurality of sections of the entire period.

According to an embodiment of the present disclosure, the calculating of the estimated power quantity may include calculating an estimated per-section power quantity for at least one section including the specific section among the plurality of sections.

According to an embodiment of the present disclosure, the determining of the target power quantity may include, based on the maximum power quantity and the estimated per-section power quantity, determining a target power quantity for the specific section.

According to an embodiment of the present disclosure, the determining of the target power quantity may include, based on the target power quantity for the specific section and the estimated per-unit-time power quantity, determining the target power quantity for the specific unit time.

According to an embodiment of the present disclosure, the calculating of the estimated per-unit-time power quantity may include calculating the estimated per-unit-time power quantity by using a triple exponential smoothing method.

According to an embodiment of the present disclosure, the calculating of the estimated per-section power quantity may include calculating the estimated per-section power quantity by using a double exponential smoothing method.

According to an embodiment of the present disclosure, in a case where the specific unit time is a first unit time of the specific section but not a first unit time of the entire period, the calculating of the estimated per-section power quantity may include calculating the estimated per-section power quantity for the specific section among the plurality of sections and for a section subsequent to the specific section.

According to an embodiment of the present disclosure, in a case where the specific unit time is a first unit time of the specific section but not a first unit time of the entire period, the determining of the target power quantity for the specific unit time may include re-determining the target power quantity for the specific section in consideration of the power quantity used for a section prior to the specific section among the plurality of sections.

According to an embodiment of the present disclosure, in a case where the specific unit time is neither a first unit time of the specific section nor a first unit time of the entire period, the calculating of the estimated per-unit-time power quantity may include calculating the estimated power quantity for the specific unit time among unit times included in the specific section and for a unit time subsequent to the specific unit time.

According to an embodiment of the present disclosure, in a case where the specific unit time is neither a first unit time of the specific section nor a first unit time of the entire period, the calculating of the estimated per-unit-time power quantity may include calculating the estimated power quantity for the specific unit time among unit times included in the specific section and for a unit time subsequent to the specific unit time.

According to an embodiment of the present disclosure, the controlling of the compressor may include: based on a saving rate corresponding to a difference between the estimated power quantity and the target power quantity for the specific unit time, correcting a preset control criterion for controlling the compressor; and controlling the compressor according to the corrected control criterion.

According to an embodiment of the present disclosure, the correcting of the control criterion may include correcting the preset control criterion as a control criterion corresponding to the saving rate by using a correction algorithm previously learned through machine learning.

According to an embodiment of the present disclosure, the controlling of the compressor may include, based on a database on an operating time during which the air conditioner has operated, calculating an operating time corresponding to the specific unit time.

According to an embodiment of the present disclosure, the controlling of the compressor may include updating the correction algorithm based on a difference between the power quantity used by the air conditioner while controlling the compressor according to the corrected control criterion and a power quantity calculated based on the operating time.

According to an embodiment of the present disclosure, the correcting of the preset control criterion may include: controlling the compressor according to the preset control criterion for a preset initial time; and based on a power quantity used by the air conditioner for the initial time and the operating time, determining whether the estimated power quantity for the specific unit time exceeds a target power quantity for the specific unit time.

According to an embodiment of the present disclosure, the correcting of the preset control criterion may include: correcting the preset control criterion when the estimated power quantity for the specific unit time exceeds the target power quantity for the specific unit time. Details of other embodiments are included in the detailed description and the drawings.

According to various embodiments of the present disclosure, there is one or more of the following effects.

According to various embodiments of the present disclosure, by determining a target power quantity on the basis of a unit time and/or section included in an entire period, it is possible to limit a power quantity used for the entire period below a target value while providing a comfortable indoor environment to the user as much as possible.

In addition, according to various embodiments of the present disclosure, it is possible to accurately calculate a power quantity expected to be used for an entire period as needed.

In addition, according to various embodiments of the present disclosure, it is possible to accurately calculate a power quantity per section, which is expected to be used for each section included in an entire period as needed.

In addition, according to various embodiments of the present disclosure, it is possible to accurately calculate an estimated per-unit-time power quantity, which is expected to be used for each unit time included in a specific section as needed.

In addition, according to various embodiments of the present disclosure, based on a maximum power quantity available for an entire period and a power quantity expected to be used for the entire period, it is possible to accurately determine a maximum power quantity available for each section and/or unit time.

In addition, according to various embodiments of the present disclosure, by updating a database on power quantity on the basis of a power quantity used for an entire period, each section and/or each unit time, it is possible to systematically or variously manage power quantity usage history of an air conditioner.

In addition, according to various embodiments of the present disclosure, it is possible to update a target power quantity on the basis of a per unit time and/or section in consideration of a power quantity usage history of an air conditioner, thereby surely limiting a power quantity used for an entire period below a target value.

In addition, according to various embodiments of the present disclosure, it is possible to appropriately update a per-section power quantity and/or a per-unit-time power quantity in consideration of a relationship between an entire period and/or a specific section and a specific unit time corresponding to a current point in time.

In addition, according to various embodiments of the present disclosure, it is possible to accurately correct a control criterion for operation of each component in consideration of a difference between a maximum power quantity available for a specific unit time and a power quantity expected to be used for the specific unit time.

In addition, according to various embodiments of the present disclosure, it is possible to update an algorithm for correcting a control criterion in real time while controlling an operation of each component according to the corrected control criterion, thereby accurately controlling an operation of each component.

The effects of the present disclosure are not limited to the above-mentioned effects, and other effects not mentioned will be clearly understood by those skilled in the art from the description of the claims.

BRIEF DESCRIPTION OF THE DRAWINGS

Embodiments will be described in detail with reference to the following drawings in which like reference numerals refer to like elements, and wherein:

FIGS. 9A to 12 are diagrams referred to in explaining an operation of an air conditioner.

DETAILED DESCRIPTION

Figure 1:
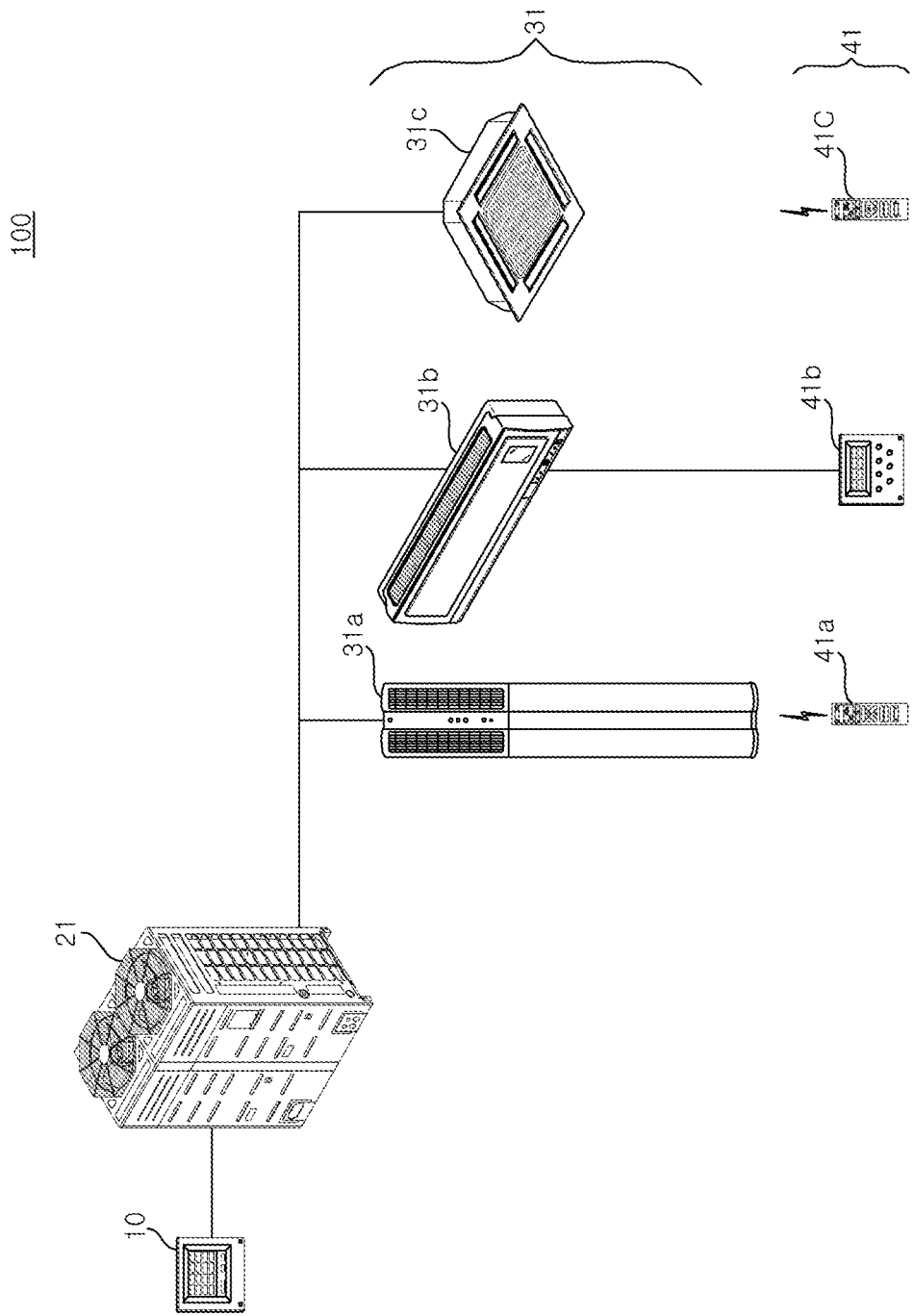
FIG. 1 is a diagram illustrating a configuration of an air conditioner according to an embodiment of the present disclosure.

Hereinafter, the present disclosure will be described in detail with reference to the drawings. In the drawings, in order to clearly and briefly describe the present disclosure, parts which are not related to the description will be omitted and, in the following description of the embodiments, the same or similar elements are denoted by the same reference numerals even though they are depicted in different drawings.

The terms "module" and "unit" used to signify components are used herein to aid in the understanding of the components and thus they should not be considered as having specific meanings or roles. Accordingly, the terms "module" and "unit" may be used interchangeably.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

It will be understood that, although the terms first, second, etc., may be used herein to describe various elements, these elements should not be limited by these terms. These terms are only used to distinguish one element from another.

Hereinafter, the present disclosure will be described with reference to the drawings for explaining a method of controlling an air conditioner according to embodiments of the present disclosure.

FIG. 1 is a diagram illustrating a configuration of an air conditioner according to an embodiment of the present disclosure, Referring to FIG. 1, an air conditioner 100 according to an embodiment of the present disclosure may include an outdoor unit 21 and at least one indoor unit 31 connected to the outdoor unit 21. A plurality of indoor units 31 may be connected to one outdoor unit 21, and the number of indoor units 31 connected to one outdoor unit 21 is not limited to the drawings.

An indoor unit 31 may include at least one of a stand-type indoor unit 31a, a wall-mounted indoor unit 31b, and a ceiling-type indoor unit 31c.

Meanwhile, the air conditioner 100 may further include at least one of a ventilator, an air purifier, a humidifier, and a heater, and may operate in conjunction with operations of the indoor unit 31 and the outdoor unit 21.

The outdoor unit 21 may include a compressor (not shown) receiving refrigerant and compressing the received refrigerant, an outdoor heat exchanger (not shown) exchanging heat between refrigerant and outdoor air, an accumulator (not shown) extracting a gaseous refrigerant from a supplied refrigerant and supplying the extracted gaseous refrigerant to the compressor, and a four-way valve (not shown) for selecting a flow path of refrigerant depending on a heating operation. In addition, the outdoor unit 21 may further include a plurality of sensors, valves, oil collecting parts, etc.

The outdoor unit 21 may operate the compressor and the outdoor heat exchanger, which are provided therein, to compress or perform heat exchange on refrigerant according to a setting or to supply refrigerant to the indoor unit 31. The outdoor unit 21 may be driven upon demand by a central controller (not shown) or the indoor unit 31. In this case, as a cooling/heating capacity of the air conditioner 100 varies in response to the indoor unit 31 being driven, the number of driven outdoor units and the number of driven compressors installed in outdoor units may be changed.

In this case, the outdoor unit 21 may supply a compressed refrigerant to the indoor unit 31 connected thereto.

The indoor unit 31 may receive refrigerant from the outdoor unit 21 and discharge cold or hot air into an indoor space. The indoor unit 31 may include an indoor heat exchanger (not shown), an indoor unit fan (not shown), an expansion valve (not shown) for expanding a supplied refrigerant, and a plurality of sensors (not shown).

In this case, the outdoor unit 21 and the indoor unit 31 may be connected to each other via a communication line to transmit and receive data. In addition, the outdoor unit 21 and the indoor unit 31 may be connected to a central controller by wire or wirelessly, thereby enabled to operate under the control of the central controller.

The remote controller 41 may be connected to the indoor unit 31 to transmit a user's control command to the indoor unit 31 and to receive and display state information of the indoor unit 31. In this case, the remote controller 41 may communicate with the indoor unit 31 by wire or wirelessly depending on a connection type.

Meanwhile, the air conditioner 100 may further include at least one sensor (not shown) capable of detecting a state of indoor air. For example, the air conditioner 100 may further include a temperature sensor for sensing indoor temperature, a humidity sensor for sensing indoor humidity, an air pressure sensor for sensing indoor air pressure, a sensor for measuring an amount of dust in indoor air, and the like. In addition, the air conditioner 100 may include a sensor for collecting various types of data such as data on temperature, humidity, atmospheric pressure, an amount of dust in the air, or the like.

Meanwhile, the air conditioner 100 may communicate with the external device 10 and may transmit and receive data to and from each other. For example, the outdoor unit 21 may receive, from the external device 10 which measures a power quantity consumed by the air conditioner 100, data on the power quantity in real time.

Figure 2:
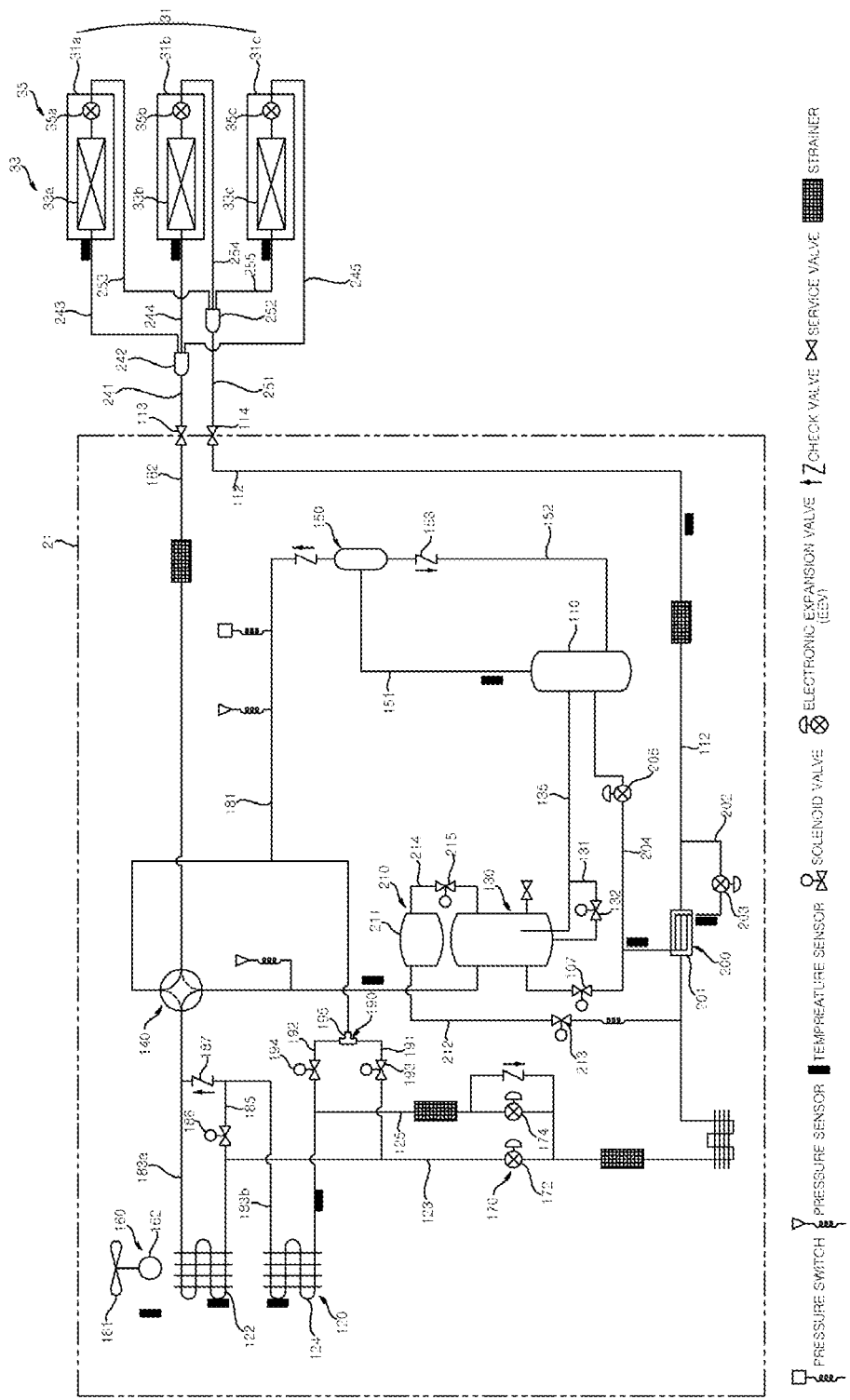
FIG. 2 is a schematic diagram of an outdoor unit and an indoor unit of FIG. 1.

FIG. 2 is a schematic diagram of an outdoor unit and an indoor unit of FIG. 1.

Referring to FIG. 2, an air conditioner 100 according to an embodiment of the present disclosure may be divided into an outdoor unit 21 and an indoor unit 31. The air conditioner 100 may include a plurality of indoor units 31a to 31c.

The outdoor unit 21 may include a compressor 110 configured to compress refrigerant, a compressor motor (not shown) configured to drive the compressor 110, an outdoor heat exchanger 120 configured to emit a compressed refrigerant, an accumulator 130 configured to temporarily store a vaporized refrigerant, remove moisture and foreign substances from the vaporized refrigerant, and then supply refrigerant at a constant pressure to the compressor, a cooling and heating switching valve 140 configured to change a flow path of the compressed refrigerant, an oil separator 150, an outdoor blower 160 including an outdoor fan 161 disposed on one side of the outdoor heat exchanger 120 to facilitate heat dissipation of refrigerant and an outdoor fan motor 162 for rotating the outdoor fan 161, at least one expansion mechanism (e.g., electronic expansion valves (EEV)) for expanding a condensed refrigerant, and the like.

More specifically, the outdoor unit 21 may include a gas pipe service valve 113 connected to a gas pipe 182 and a liquid pipe service valve 114 connected to the liquid pipe 112. The gas pipe service valve 113 and the liquid pipe service valve 114 may be connected to the indoor unit 31 and may circulate refrigerant of the outdoor unit 21.

At least one of an inverter compressor and a fixed-speed compressor may be used as the compressor 110. High-temperature, high-pressure refrigerant discharged from the compressor 110 may flow to the oil separator 150 through a discharge-side pipe 151 of the compressor 110.

The outdoor unit 21 may include a first oil collecting pipe 131 connecting a lower side of the accumulator 130 and a suction-side pipe 135 of the compressor 110. An oil return valve 132 for regulating a flow of oil may be disposed in the first oil collecting pipe 131.

The outdoor unit 21 may include a second oil collecting pipe 152 through which oil flows from the oil separator 150 to the compressor 110. A check valve 153 for restricting oil to flow to one side may be disposed in the second oil collecting pipe 152.

Refrigerant discharged from the oil separator 150 may flow to the cooling and heating switching valve 140 through a refrigerant discharge pipe 181.

The outdoor heat exchanger 120 may perform heat exchange between outdoor air and refrigerant and may be provided as a plurality of outdoor heat exchangers 122 and 124 according to an embodiment. The outdoor heat exchanger 120 may operate as a condenser during a cooling operation and as an evaporator during a heating operation.

A variable path valve 186 may be interposed between a first outdoor heat exchanger 122 and a variable path pipe 185. When the variable path valve 186 is opened, refrigerant flowing in the first outdoor heat exchanger 122 passes through the variable path valve 186, the variable path pipe 185, and the check valve 187 to the cooling and heating switching valve 140. When the variable path valve 186 is closed, refrigerant flowing in the first outdoor heat exchanger 122 during a cooling operation may flow to a first heat exchanger-expansion valve connecting pipe 123 and refrigerant flowing through the first heat exchanger-expansion valve connecting pipe 123 may flow to the first outdoor heat exchanger 122.

The outdoor expansion valve 170 may expand refrigerant flowing into the outdoor heat exchanger 120 during a heating operation, and may allow refrigerant to pass therethrough, without expanding the refrigerant, during a cooling operation. As the outdoor expansion valve 170, an electronic expansion valve (EEV) capable of regulating an opening value in accordance with an input signal may be used.

The outdoor expansion valve 170 may include a first outdoor expansion valve 172 for expanding refrigerant flowing to the first outdoor heat exchanger 122 and a second outdoor expansion valve 172 for expanding refrigerant flowing into the second outdoor heat exchanger 124.

The first outdoor heat exchanger 122 may be connected to the cooling and heating switching valve 140 through a heat exchanger-switching valve connecting pipe 183a. The first outdoor heat exchanger 122 may be connected to the outdoor expansion valve 170 through the first heat exchanger-expansion valve connecting pipe 123.

The second outdoor heat exchanger 124 may be connected to the second outdoor expansion valve 174 through a second heat exchanger-expansion valve connecting pipe 125.

The first outdoor expansion valve 172 may be interposed between the first heat exchanger-expansion valve connecting pipe 123 and a supercooling liquid pipe 112'. The second outdoor expansion valve 174 may be interposed between the second heat exchanger-expansion valve connecting pipe 125 and the supercooling liquid pipe 112'.

The outdoor unit 21 may further include a hot gas unit 190 for bypassing refrigerant, which is to be supplied to the outdoor heat exchanger 120, to the indoor unit 31 during a heating operation. The hot gas unit 90 may include hot gas bypass pipes 191 and 192 for bypassing refrigerant, and hot gas valves 193 and 194. In this case, a first hot gas valve 193 and a second hot gas valve 194 may be selectively operated. For example, only the first hot gas valve 193 may be opened or closed, or only the second hot gas valve 194 may be opened or closed. Meanwhile, in this embodiment, a combination valve 195 for combining the first hot gas bypass pipe 191 and the second hot gas bypass pipe 192 may be disposed.

The outdoor unit 21 may further include a supercooling unit 200 disposed in the liquid pipe 112. The supercooling unit 200 may include a supercooling heat exchanger 201, a supercooling bypass pipe 202 bypassed in the liquid pipe 112 and connected to the supercooling heat exchanger 201, a first supercooling expansion valve 203 disposed in the supercooling bypass pipe 202 and selectively expanding refrigerant flowing therein, a supercooling-compressor connecting pipe 204 connecting the supercooling heat exchanger 201 and the compressor 110, a second supercooling expansion valve 205 disposed in the supercooling-compressor connecting pipe 204 and selectively expanding refrigerant flowing therein, an accumulator bypass pipe 206 connecting the accumulator 130 and the supercooling-compressor connecting pipe 204 and/or a supercooling bypass valve 107 for controlling refrigerant flowing in the accumulator bypass pipe 206.

The outdoor unit 21 may further include a receiver 210 disposed in the liquid pipe 112. The receiver 210 may store liquid refrigerant in order to control an amount of circulating refrigerant. The receiver 210 may store the liquid refrigerant separately from liquid refrigerant being stored in the accumulator 30. For example, when the amount of the circulating refrigerant is insufficient, the receiver 210 may supply refrigerant to the accumulator 130, and when the amount of the circulating refrigerant is large, the receiver 210 may collect and store the refrigerant.

The receiver 210 may include a receiver tank 211 for storing refrigerant, and receiver valves 213 and 215 for regulating a flow of refrigerant.

A first receiver connecting pipe 112 may connect the receiver tank 211 and the supercooling liquid pipe 112' to each other. A first receiver valve 213 for regulating a flow of refrigerant may be disposed in the first receiver connecting pipe 112.

A second receiver connecting pipe 114 may connect the receiver tank 211 and the accumulator 130 to each other. A second receiver valve 215 for regulating a flow of refrigerant may be disposed in the second receiver connecting pipe 114.

The indoor units 31a to 31c may include indoor heat exchangers 33a to 33c each disposed indoors to perform a cooling or heating function, indoor expansion valves 35a to 35c each for expanding refrigerant to be supplied, indoor blowers (not shown) each including an indoor fan (not shown) disposed on one side of each of the indoor heat exchangers (33a to 33c) to facilitate heat dissipation of refrigerant and an indoor fan motor (not shown) for rotating the indoor fan, a plurality of sensors (not shown), and the like. At least one of the indoor heat exchangers 33a to 33c may be installed in each of the indoor units 31a to 31c.

The air conditioner 100 may include a gas pipe connecting pipe 241 connecting the gas pipe service valve 113 and a first distributor 242, and a liquid pipe connecting pipe 251 connecting the liquid pipe service valve 114 and a second distributor 252.

The first distributor 245 may be connected to the indoor heat exchangers 33a to 33c through first to third gas branch pipes 243, 244 and 245. The second distributor 252 may be connected to the indoor heat exchangers 33a to 33c through the first to third liquid branch pipes 253, 254 and 255.

The air conditioner 100 may be configured as an air cooler to cool an indoor space or may be configured as a heat pump to cool or heat the indoor space.

Figure 3:
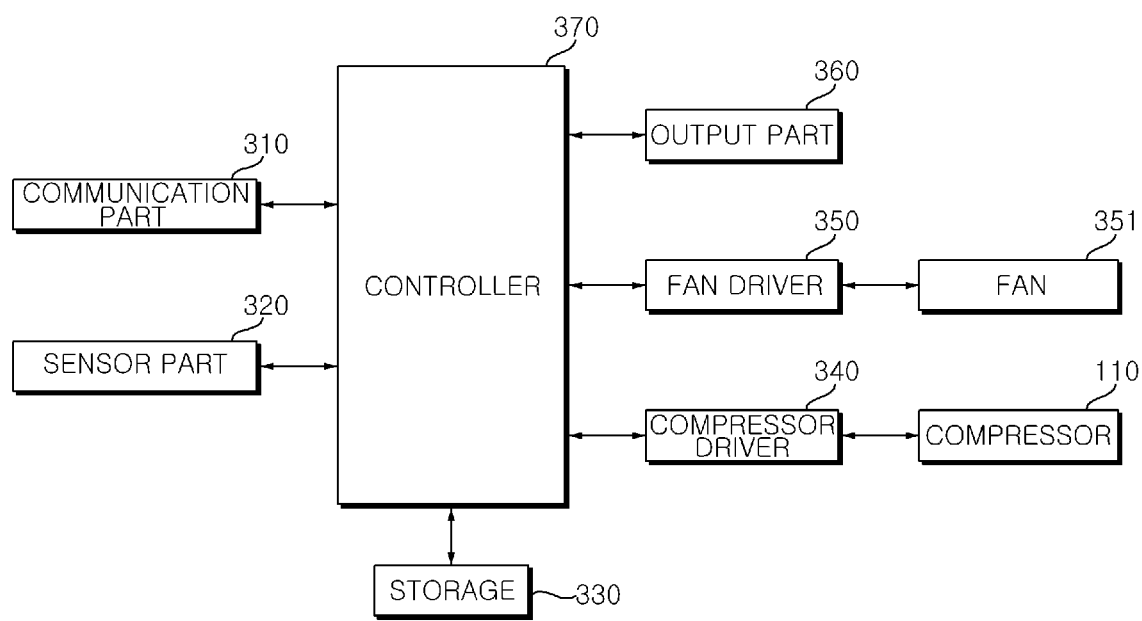
FIG. 3 is a block diagram of an air conditioner according to an embodiment of the present disclosure.

FIG. 3 is a block diagram of an air conditioner according to an embodiment of the present disclosure.

Referring to FIG. 3, an air conditioner 100 may include a sensor part 310, a communication part 320, a fan driver 330, a compressor driver 340, a storage 350, an output part 360 and/or a controller 370. The air conditioner 100 according to various embodiments of the present disclosure may further include various components not shown in FIG. 3.

The communication part 310 may include at least one communication module. The communication part 310 may be provided in each of an outdoor unit 21 and an indoor unit 31, and the outdoor unit 21 and the indoor unit 31 may transmit and receive data to and from each other. For example, a method for communication between the outdoor unit 21 and the indoor unit 31 may be wireless communication such as a Wi-Fi, Bluetooth, Beacon, and zigbee as well as communication using a power line, serial communication (e.g., RS-485 communication) and wired communication through a refrigerant pipe.

Meanwhile, the communication part 310 may transmit and receive data to and from an external device. For example, the communication part 310 may establish a wireless communication channel with an external device (e.g., a mobile terminal), and may transmit and receive data on a state of each component provided in the air conditioner 100 and on whether or not an error has occurred through the established wireless communication channel. The communication part 310 may connect to a server, which is connected to an external network, to transmit and receive data.

The sensor part 320 may include a plurality of sensors and may transmit data on detection values detected by the plurality of sensors to the controller 370. For example, the sensor part 320 may include a heat exchanger temperature sensor (not shown) for detecting temperature of the outdoor heat exchanger 120 and/or the indoor heat exchanger 33, a pressure sensor (not shown) for detecting pressure of refrigerant flowing through each pipe of the air conditioner 100, a pipe temperature sensor (not shown) for detecting temperature of refrigerant flowing through each pipe of the air conditioner 100, an indoor temperature sensor (not shown) for detecting indoor temperature, and the like.

The storage 330 may store a program for processing and controlling each signal in the controller 370 or may store a signal-processed voice or a data signal. For example, the storage 330 may store application programs designed to perform various tasks that can be processed by the controller 370, and may selectively select some of the stored application programs upon a request from the controller 370. The programs stored in the storage 330 are not particularly limited as long as they can be executed by the controller 370.

Although the embodiment in which the storage 330 of FIG. 3 is provided separately from the controller 370 is illustrated, the scope of the present disclosure is not limited thereto, and the storage 330 may be included in the controller 370.

The storage 330 may store data related to each component provided in the air conditioner 100. For example, the storage 330 may store data on detection values detected by a plurality of sensors provided in the sensor part 320. For example, the storage 330 may store data on an operating frequency of the compressor 110, pressure of refrigerant flowing into the compressor 110 (hereinafter, referred to as "compressor low pressure"), pressure of refrigerant discharged from the compressor 110 (hereinafter, referred to as "compressor high pressure"), and the like. For example, the storage 330 may store data on the rotational speed of the fan 351, an opening degree of each electronic expansion valves (EEV), a degree of superheating of each EVV, a degree of subcooling of each EVV, and the like. For example, the storage 330 may store at least one database on a power quantity consumed by the air conditioner 100 and the like.

The compressor driver 340 may drive the compressor 110. For example, the compressor driver 340 may include a rectifier (not shown) for rectifying AC power into DC power and outputting the DC power, a dc terminal capacitor for storing a pulsating voltage from the rectifier, an inverter (not shown) provided with a plurality of switching elements to convert smoothed DC power to three-phase AC power of a predetermined frequency and output the three-phase AC power and/or a compressor motor (not shown) for driving the compressor 110 based on the three-phase AC power output from the inverter.

The compressor driver 340 may change the operating frequency of the compressor 110 under the control of the controller 370. For example, under the control of the controller 370, the compressor driver 340 may change the operating frequency of the compressor 110 by changing a frequency of the three-phase AC power output to the compressor motor.

The fan driver 350 may drive the fan 351 provided in the air conditioner 100. For example, the fan driver 350 may drive the outdoor fan 161 and/or an indoor fan (not shown). For example, the fan driver 350 may include a rectifier (not shown) for rectifying AC power into DC power and outputting the rectified DC power, a dc terminal capacitor for storing a pulsating voltage from the rectifier, an inverter (not shown) provided with a plurality of switching elements to convert the rectified DC power into three-phase AC power of a predetermined frequency and output the three-phase AD power and/or a motor for driving a fan based on the three-phase AC power output from the inverter.

Meanwhile, the fan driver 350 may be provided with a configuration for driving the outdoor fan 161 and the indoor fan separately.

The fan driver 350 may change a rotational speed of the fan 351 under the control of the controller 370. For example, under the control of the controller 370, the fan driver 350 may change the rotational speed of the outdoor fan 161 by changing a frequency of the three-phase AC power output to the outdoor fan motor. For example, under the control of the controller 370, the fan driver 350 may change the rotational speed of the indoor fan by changing a frequency of the three-phase AC power output to the indoor fan motor.

The output part 360 may include a display device such as a display (not shown) and a light emitting diode (LED), and may display an operation state of the air conditioner 100, occurrence of an error, through the display device, and the like.

The output part 360 may include an audio device such as a speaker and a buzzer, and may output a sound effect corresponding to an operating state of the air conditioner 100 through an audio device and output a predetermined warning sound in the event of an error.

The controller 370 may be connected to each component provided in the air conditioner 100 and may control the overall operation of each component. The controller 370 may transmit and receive data to and from each component provided in the air conditioner 100. The controller 370 may be provided in at least one of the indoor unit 31 and/or a central controller as well as the outdoor unit 21. For example, the outdoor unit 21, the indoor unit 31, and the central controller may each include a controller 370 for controlling operations.

The controller 370 may include at least one processor. Here, the processor may be a general processor such as a central processing unit (CPU). Of course, the processor may be a dedicated device such as an ASIC or other hardware-based processor.

The controller 370 may generate a learning model by learning data related to each component provided in the air conditioner 100 through machine learning such as deep learning. The controller 370 may control each component included in the air conditioner 100 by using data related to each component included in the air conditioner 100 and a pre-learned learning model.

Hereinafter, with reference to FIG. 4, deep learning will be described in detail.

Figure 4:
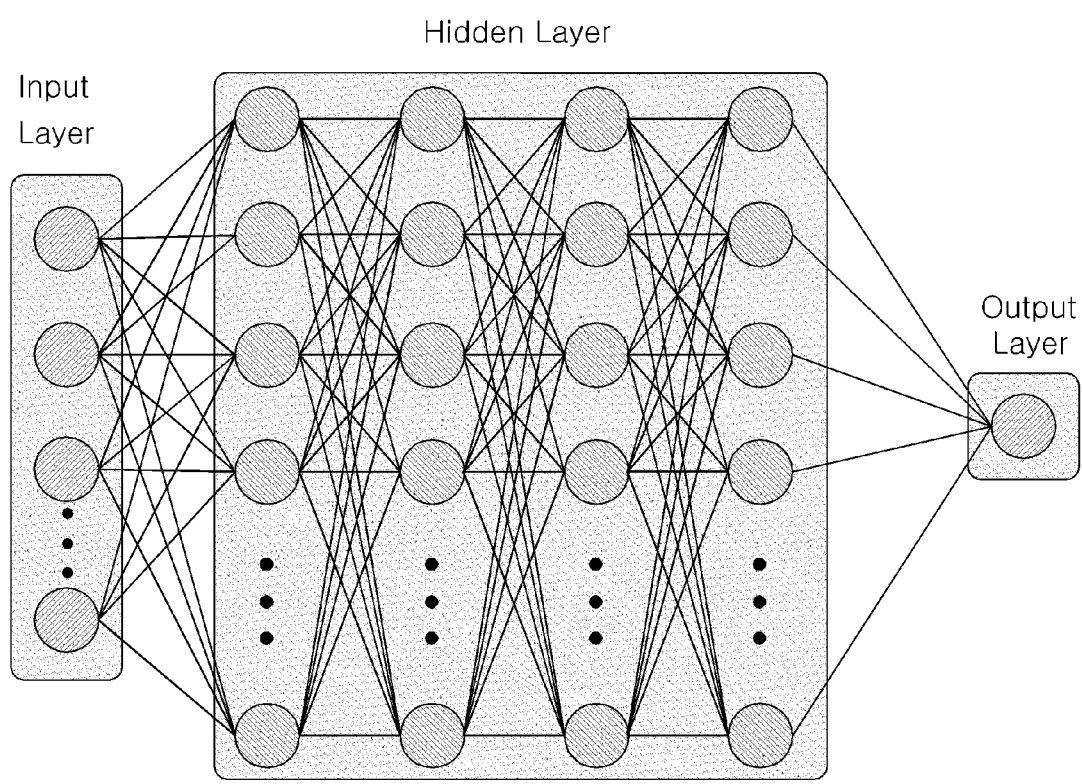
FIG. 4 is a diagram referred to in explaining deep learning, according to an embodiment of the present disclosure.

FIG. 4 is a diagram referred to in explaining deep learning, according to an embodiment of the present disclosure.

Machine learning refers to a technology in which a computer learns from data without a human's instructing the computer directly to logic, so that the computer can solve a problem.

Deep learning is a method of teaching a computer a human way of thinking based on artificial neural networks (ANN) and the like, that is, an artificial intelligence technology which allows computers to learn on their own like humans. The ANN may be implemented in the form of software or in the form of hardware such as a chip. For example, the ANN may include various types of algorithms such as a deep neural network (DNN), a convolutional neural network (CNN), a recurrent neural network (RNN), a deep belief network (DBN), etc.

Referring to FIG. 4, the ANN may include an input layer, a hidden layer, and an output layer. Each layer may include a plurality of nodes, each layer may be connected to a next layer, and nodes between neighboring layers may be connected to each other with a weight.

A computer may discover a certain pattern from data to form a feature map and extract a low-level feature, a middle-level feature, and a high-level feature to recognize an object and output a result.

In addition, each node may operate based on an activation model, and an output value corresponding to an input value may be determined by an activation model.

An output value of an arbitrary node, for example, a node of low-level feature, may be input to a next layer connected to the corresponding node, for example, a node of intermediate-level feature. A node of a next layer, for example, a node of intermediate-level feature may receive values output from a plurality of nodes of lower-level feature.

In this case, an input value of each node may be a value in which a weight is applied to an output value of the node of the previous layer. A weight may refer to a connection strength between nodes. In addition, a deep learning process may be regarded as a process of finding out appropriate weights and biases.

Meanwhile, an output value of an arbitrary node, for example, an intermediate-level feature, may be input to a next layer connected to the corresponding node, for example, a node of higher-level feature. A node of a next layer, for example, a node of a higher-level feature, may receive values output from a plurality of nodes of intermediate-level feature.

An ANN may extract feature information corresponding to each level by using a learned layer corresponding to a corresponding level. The ANN may recognize a predetermined object by sequentially abstracting and utilizing feature information of a highest level.

Meanwhile, learning of the ANN may be accomplished by adjusting the weight of the connection line between nodes so that a desired output is obtained with respect to input data, and a bias value may also be adjusted, if necessary. In addition, the ANN may continuously update a weight value by learning. In addition, a method such as back-propagation and the like may be used for learning of the ANN.

The storage 330 may store data obtained from each component provided in the air conditioner 100, data for learning of the ANN, and the like. For example, the storage 330 may store a database including data for each component provided in the air conditioner 100 for the purpose of learning of the ANN, weights and biases included in the structure of the ANN, and the like.

Meanwhile, the controller 370 may include a data acquirer (not shown), a model learning part (not shown), and/or a result calculator (not shown).

The data acquirer may acquire data on each component provided in the air conditioner 100 and determine input data that is a target to be learned among the acquired data.

The model learning part may generate a learning model by learning the input data. The model learning part may update a pre-generated learning model based on data on each component provided in the air conditioner 100.

The result calculator may calculate result data corresponding to input data by using the input data and the pre-learned learning model from among the data on each component provided in the air conditioner 100.

FIGS. 5 to 8 are flowcharts each illustrating an operation method of the air conditioner according to an embodiment of the present disclosure, and FIGS. 9A to 12 are diagrams referred to in explaining operations of the air conditioner.

Figure 5:
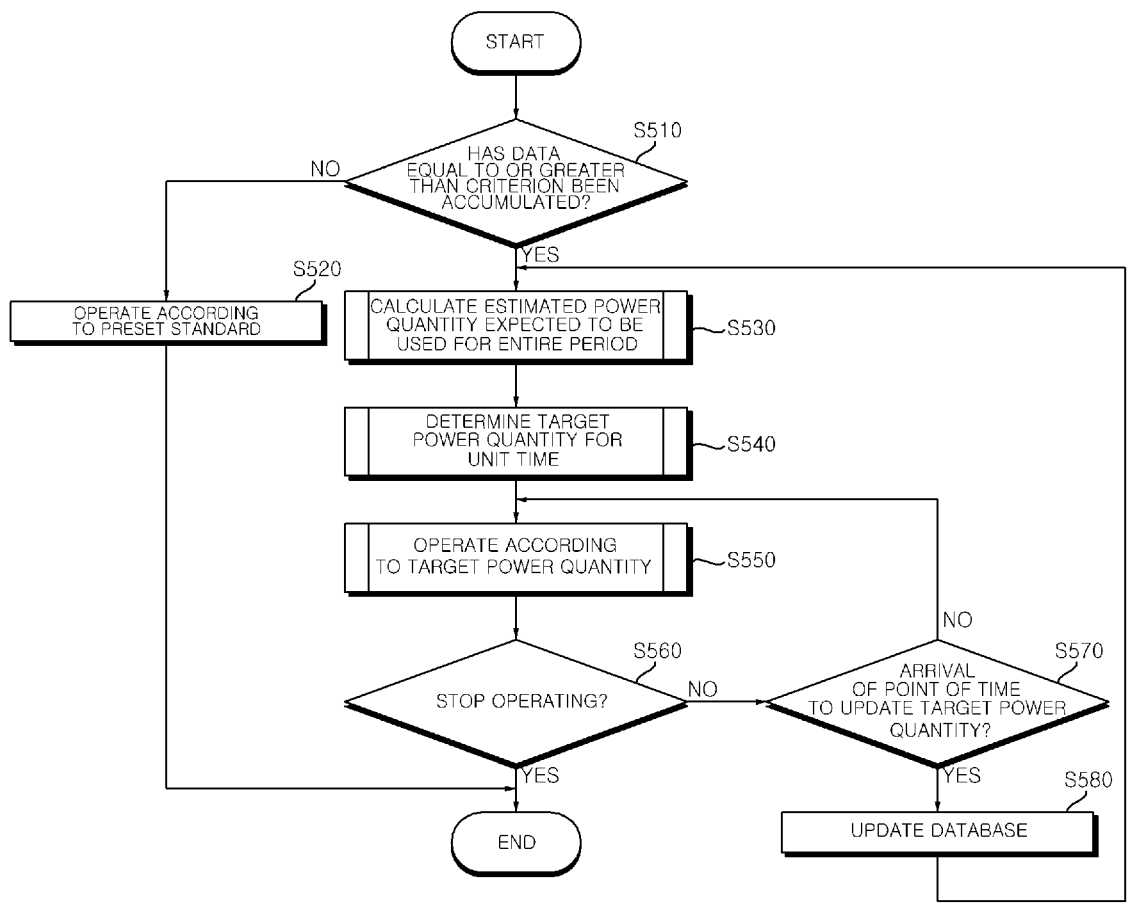
FIGS. 5 to 8 are flowcharts illustrating an operation method of an air conditioner according to an embodiment of the present disclosure.

Referring to FIG. 5, in S510, an air conditioner 100 may determine whether data equal to or greater than a predetermined criterion are accumulated in a database of a storage 330. Here, the database may be configured with accumulated data on a power quantity used by the air conditioner 100 on a per unit time basis. For example, the air conditioner 100 may determine that data equal to or greater than the predetermined criterion have been accumulated when data for equal to or longer than an entire period corresponding to a period in which an electricity rate is to be calculated have been accumulated in the database.

Hereinafter, for convenience of explanation, it will be described that the entire period corresponding to the period in which the electricity rate is to be calculated is one month, a unit time is one day, and a section consisting of unit times is one week, but the present disclosure is not limited thereto.

In S520, the air conditioner 100 may operate according to a preset criterion when it is not determined that data equal to or greater than the predetermined criterion have been accumulated in the database. For example, the air conditioner 100 may monitor a power quantity used for a unit time. In this case, the air conditioner 100 may keep an operating frequency of the compressor 110 to a minimum when the power quantity used for a unit time becomes close a preset per-unit-time target value, and the air conditioner 100 may stop operating when the power quantity used for the unit time has reached the per-unit-time target value.

In S530, the air conditioner 100 may calculate a power quantity expected to be used by the air conditioner 100 (hereinafter, an estimated power quantity) for at least a part of an entire period when it is determined that data equal to or greater than the predetermined criterion have been accumulated in the database. In this regard, it will be described in more detail with reference to FIG. 6.

Figure 6:
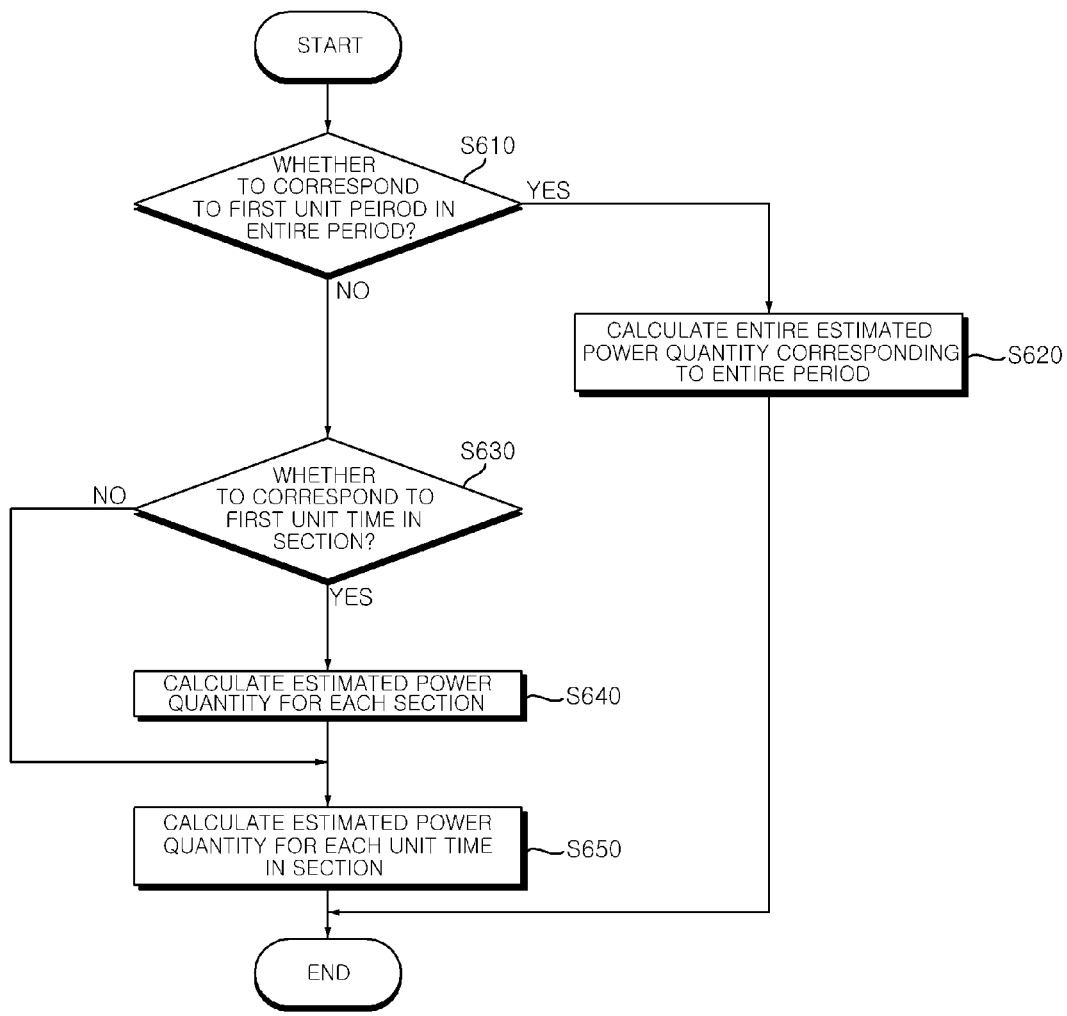

Referring to FIG. 6, in S610, the air conditioner 100 may determine whether a specific unit time corresponding to a current point in time corresponds to a first unit time of the entire period.

When the current point in time corresponds to a point in time that a period at which an electricity rate is calculated starts, the air conditioner 100 may determine that the specific unit time corresponds to the first unit time of the entire period. For example, when the point in time that the period at which the electricity rate is calculated starts is midnight on the fourth day of each month, the fourth day of each month may be set as the first unit time of the entire period.

In S620, the air conditioner 100 may calculate every estimated power quantity related to the entire period when the specific unit time corresponds to the first unit time of the entire period. For example, the air conditioner 100 may calculate an estimated power quantity related to the entire period from data included in the database by using an exponential smoothing method. Here, the exponential smoothing method may refer to a method in which a greatest weight is given to latest data, the weight which geometrically reduced as a point of time when corresponding data is accumulated in the database is further earlier than the current point in time.

Referring to FIG. 9A, the air conditioner 100 may calculate an estimate power quantity related to a next entire period 920, based on a per-unit-time power quantity used by the air conditioner 100 over a previous entire period 910 during which data have been accumulated in the database.

The air conditioner 100 may calculate an estimated per-section power quantity for a plurality of sections included in an entire period, based on a per-unit-time power quantity used by the air conditioner over a previous entire period among data stored in the database. In this case, the air conditioner 100 may calculate an estimated per-section power quantity by using a double exponential smoothing method corresponding to Equation 1 below.

$$L_t = \alpha Y_t + (1-\alpha)(L_{t-1} + B_{t-1})$$

$$B_t = \beta(L_t - L_{t-1}) + (1-\beta)B_{t-1}$$

$$F_{t+h} = L_t + hB_t \qquad \text{[Equation 1]}$$

In the above Equation 1, $L_t$ may denote a level component at t, $Y_t$ may denote a data value at t, $B_t$ may denote a trend component at t, $\alpha$ may denote a weight for the level component, $\beta$ may denote a weight for the trend component, and $F_{t+h}$ may denote an estimated value from t to h. Here, $\alpha$ and $\beta$ may be values greater than 0 and less than 1.

In this case, the air conditioner 100 may perform cross-validation in which some of data on a per-unit-time power quantity used by the air conditioner 100 over a previous entire period are used as training data by changing α and/or β on a 0.1 unit basis, while the remaining are used as test data. In this case, according to a result of the cross-validation, α and β with a smallest error may be used to calculate an estimated per-section power quantity.

The air conditioner 100 may calculate an estimated per-unit-time power quantity included in a first section of an entire period, based on a per-unit-time power quantity used by the air conditioner 100 over a previous entire period among data stored in the database. In this case, the air conditioner 100 may calculate an estimated per-unit-time power quantity by using a triple exponential smoothing method corresponding to Equation 2 below.

$$L_t = \alpha(Y_t - S_{t-m}) + (1-\alpha)(L_{t-1} + B_{t-1})$$

$$B_t = \beta(L_t - L_{t-1}) + (1-\beta)B_{t-1}$$

$$S_t = \gamma(Y_t - L_{t-1} - B_{t-1}) + (1-\gamma)S_{t-m}$$

$$F_{t+h} = L_t + hB_t + S_{t+h-m(k+1)} \quad \text{[Equation 2]}$$

In the above Equation 2, $S_t$ may denote a seasonal component at t, m may denote a period of seasonality, and γ may denote a weight for the seasonal component. Here, γ may be a value greater than 0 and less than 1.

In this case, the air conditioner 100 may perform cross-validation in which some of data on a per-unit-time power quantity used by the air conditioner 100 over a previous entire period are used as training data by changing α, β and/or γ on a 0.1 unit basis, while the remaining are used as test data. At this time, according to a result of the cross-validation, α, β, and γ with a smallest error may be used to calculate an estimated per-unit-time power quantity for a unit time included in the first section of the entire period.

Meanwhile, referring to FIG. 9B, when a specific unit time corresponding to the current point in time corresponds to a first unit time 931 of the entire period, the air conditioner 100 may calculate an estimated per-section power quantity 941 for a plurality of sections, calculate an estimated per-unit-time power quantity 951 for a unit time included in a first section, and correct the estimated power quantity for the first section.

The air conditioner 100 may calculate a total sum of estimated per-section power quantities 941 for the plurality of sections as an estimated power quantity corresponding to the entire period, which is expected to be used by the air conditioner 100 for the entire period.

In S630, when a specific unit time does not correspond to the first unit time of the entire period, the air conditioner 100 may determine whether the specific unit time corresponds to the first unit time of any one of the plurality of sections included in the entire period. Here, a section including the specific unit time among the plurality of sections may be referred to as a specific section.

In S640, when the specific unit time corresponds to the first unit time of the specific section, the air conditioner 100 may calculate an estimated per-section power quantity for the specific section among the plurality of sections and for a section subsequent to the specific section. For example, the air conditioner 100 may calculate an estimated per-section power quantity by using a double exponential smoothing method corresponding to Equation 1 described above.

Referring to FIG. 9C, when the specific unit time corresponding to a current point in time point corresponds to a first unit time 932 in the second week of the entire period, the air conditioner 100 may calculate an estimated per-section power quantity 942 from the second week to the fifth week. In this case, the database may store data on the per-unit-time power quantity used by the air conditioner 100 of the first week, and the air conditioner 100 may calculate an estimated per-section power quantity by using latest data including data on the first week among data accumulated in the database.

In S650, the air conditioner 100 may calculate an estimated per-unit-time power quantity for a specific unit time among unit times included in the specific section and for a unit time subsequent to the specific unit time. For example, the air conditioner 100 may calculate an estimated per-unit-time power quantity by using a triple exponential smoothing method corresponding to Equation 2 described above.

Referring to FIG. 9C, when a specific unit time corresponds to Monday, which is the first unit time 932 of the second week of the entire period, the air conditioner 100 may calculate an estimated per-unit-time power quantity 952 for a unit time included in the second week. In this case, based on the estimated per-unit-time power quantity 952 of the second week, the air conditioner 100 may correct the estimated power quantity of the second week, which is the estimated power quantity for the specific section calculated in S640.

Meanwhile, referring to FIG. 9D, when the specific unit time corresponds to Thursday 933 rather than Monday, which is the first unit time of the second week of the entire period, the air conditioner 100 may calculate an estimated per-unit-time power quantity 953 of Thursday to Sunday among unit times included in the second week.

In this case, the database may store data on the per-unit-time power quantity used by the air conditioner 100 of Monday to Wednesday in the second week, and the air conditioner 100 may calculate an estimated per-unit-time power quantity by using latest data including data on Monday to Wednesday in the second week among data accumulated in the database.

Meanwhile, when the specific unit time is neither the first unit time of the entire period nor the first unit time of the specific period, the air conditioner 100 may omit calculating an estimated per-section power quantity. That is, the air conditioner 100 may calculate an estimated per-section power quantity when the entire period starts and/or when a specific section starts.

Figure 10A:
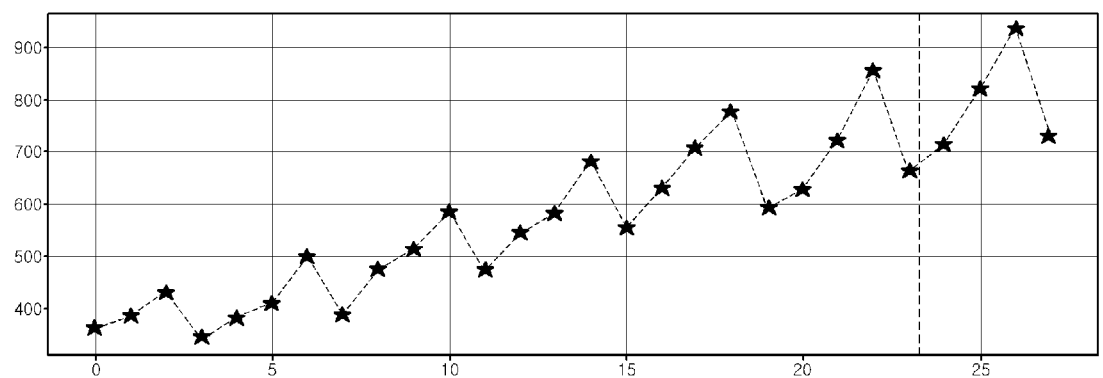
Figure 10B:
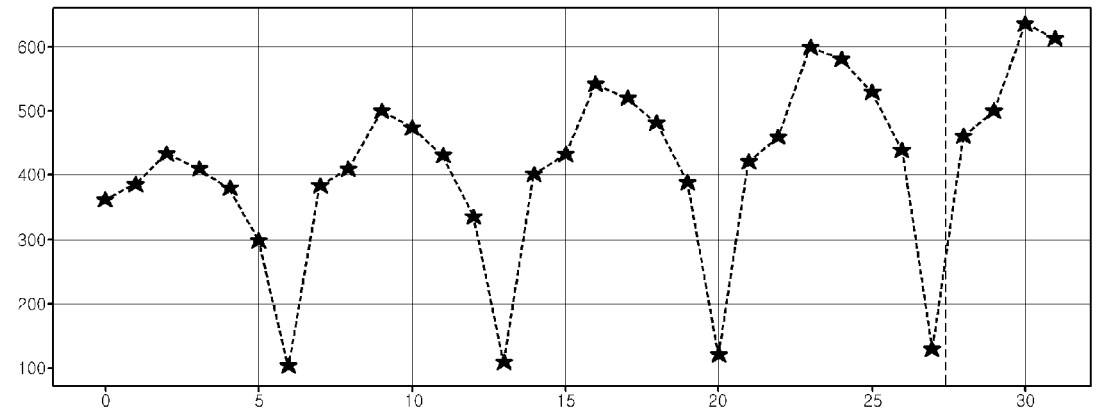

Referring to FIGS. 10A and 10B, it can be seen a graph showing results of calculating an estimated per-unit-time power quantity by using a triple exponential smoothing method. In FIG. 10A, it can be seen that a power quantity usage pattern is repeated every 4 days, and in FIG. 10B, it can be seen that a power quantity usage pattern is repeated every 7 days. In this case, an air conditioner 100 may calculate an estimated per-unit-time power quantity corresponding to a power quantity usage pattern by using the triple exponential smoothing method.

Referring back to FIG. 5, in S540, the air conditioner 100 may determine a target power quantity for a specific unit time. Here, the target power quantity for the specific unit time may refer to a maximum power quantity available for the air conditioner 100 for the specific unit time. In this regard, it will be described in more detail with reference to FIG. 7.

Figure 7:
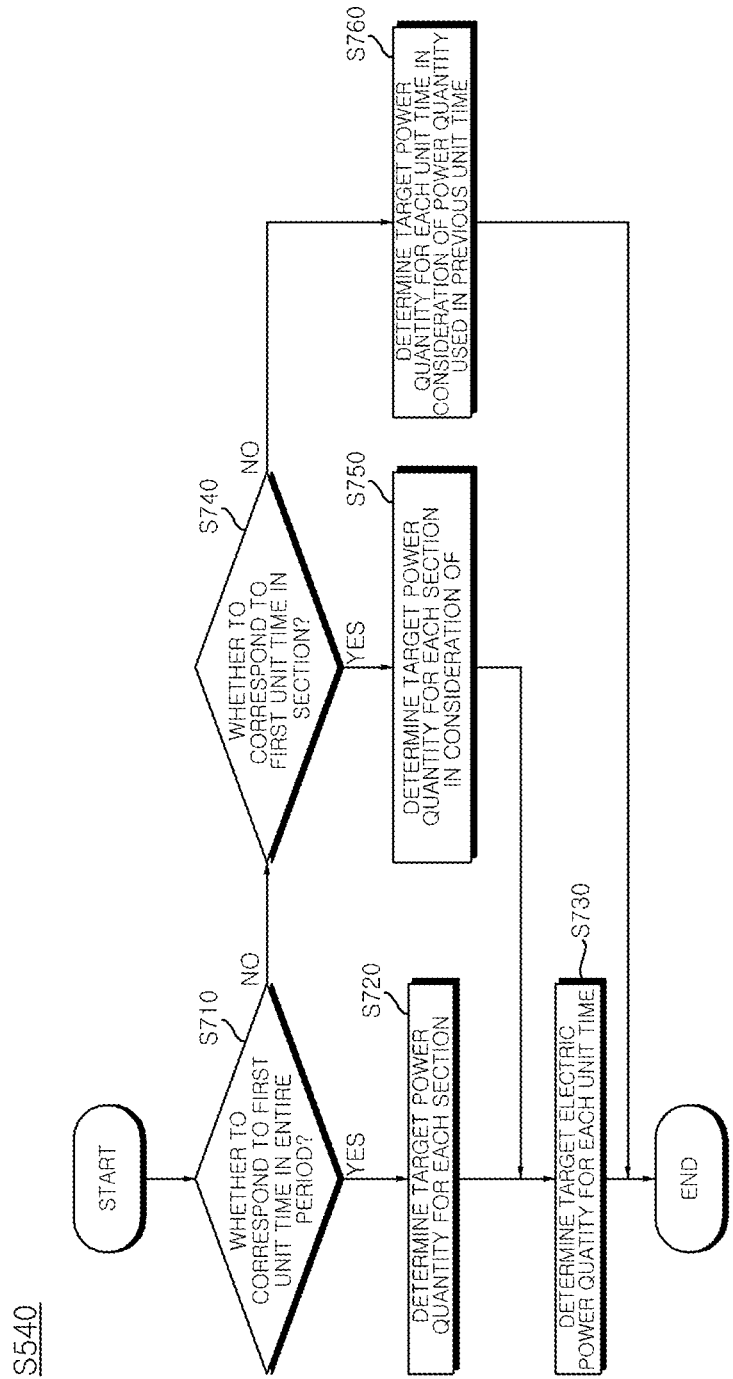

Referring to FIG. 7, in S710, the air conditioner 100 may determine whether the specific unit time corresponding to a current point in time corresponds to a first unit time of an entire period.

In S720 and S730, when the specific unit time corresponds to the first unit time of the entire period, the air conditioner 100 may determine a target per-section power quantity for a plurality of sections included in the entire period and determine a target per-unit-time power quantity for a unit time included in a first section of the entire period. Here, the target per-section power quantity may refer to a maximum power quantity available for each section.

Referring to FIG. 9B, the air conditioner 100 may determine a target per-section power quantity 961, according to how much the estimated per-section power quantity 941 accounts for in the estimated power quantity corresponding to the entire period. In this case, a total sum of target power quantities for all sections may be equal to 400 kWh, which is a maximum power quantity preset for the entire period. In addition, when an estimated power quantity corresponding to the entire period is 550 kWh, a total power quantity required to be reduced in the entire period may be 150 kWh, and a power quantity required to be reduced in each section may correspond to how much a power quantity per section accounts for the entire period.

Meanwhile, the air conditioner 100 may determine a target per-unit-time power quantity of the first section according to how much an estimated per-unit-time power quantity 951 of the first section accounts for the estimated power quantity for the first section. In this case, a total sum of target per-unit-time power quantities of the first section may be equal to 43.6 Wh, which is a target power quantity for the first week.

In S740, when the specific unit time does not correspond to the first unit time of the entire period, the air conditioner 100 may determine whether a specific unit time corresponds to a first unit time of any one of a plurality of sections included in the entire period.

In S750, when the specific unit time does not correspond to the first unit time of the entire period but corresponds to a first unit time of a specific section, the air conditioner 100 may calculate a target per-section power quantity for the specific section and for a section subsequent to the specific section in consideration of a power quantity used in a section prior to the specific section.

Referring to FIG. 9C, when the specific unit time corresponds to the first unit time 932 of the second week of the entire period, the air conditioner 100 may calculate a target per-section power quantity 962 of the second week to the fifth week.

Meanwhile, when the power quantity used by the air conditioner 100 in the first week is 45 kWh, a residual power quantity usable in the second to fifth weeks may be limited to 355 kWh out of the preset maximum power quantity of 400 kWh. The air conditioner 100 may re-determine the target per-section power quantity 962 according to how much the estimated per-section power quantity 942 of the second week to the fifth week accounts for the residual power quantity of 355 kWh. In this case, a total sum of re-determined target per-section power quantities 962 may be less than or equal to 355 kWh, which is the residual power quantity.

Meanwhile, in S730, when the specific unit time does not correspond to the first unit time of the entire period but corresponds to a first unit time of a specific section, the air conditioner 100 may determine a target per-unit-time power quantity included in the specific section.

Referring to FIG. 9C, the air conditioner 100 may determine a target per-unit-time power quantity of the second week according to how much the estimated per-unit-time power quantity 952 of the second week accounts for a target power quantity for the second week. In this case, a total sum of target per-unit-time power quantities of the second week may be equal to 87.3 Wh, which is the target power quantity for the second week.

In S760, when the specific unit time is neither the first unit time of the entire period nor the first unit time of the specific section, the air conditioner may calculate a target per-unit-time power quantity for a specific unit time among unit times included in the specific section and for a unit time subsequent to the specific unit time in consideration of a power quantity used for a unit time prior to the specific unit time among the unit times included in the specific section.

Referring to FIG. 9D, when the specific unit time corresponds to Thursday 933 rather than Monday, which is the first unit time of the second week of the entire period, the air conditioner 100 may re-determine a target per-unit-time power quantity of Thursday to Sunday among unit times included in the second week. In this case, the air conditioner 100 may calculate a power quantity available from Thursday to Sunday by subtracting a power quantity used from Monday to Wednesday from the target power quantity of 87.3 kWh for the second week.

In addition, the air conditioner 100 may determine a target per-unit-time power quantity from Thursday to Sunday, according to how much each estimated per-unit-time power quantity 953 of Thursday to Sunday accounts for the total sum of estimated per-unit-time power quantities 953 of Thursday to Sunday.

Referring back to FIG. 5, in S550, the air conditioner 100 may operate for a specific unit time based on the determined target power quantity for the specific unit time. For example, the air conditioner 100 may control the compressor 110 for the specific unit time, based on the target power quantity determined for the specific unit time. In this regard, it will be described in more detail with reference to FIG.

Figure 8:
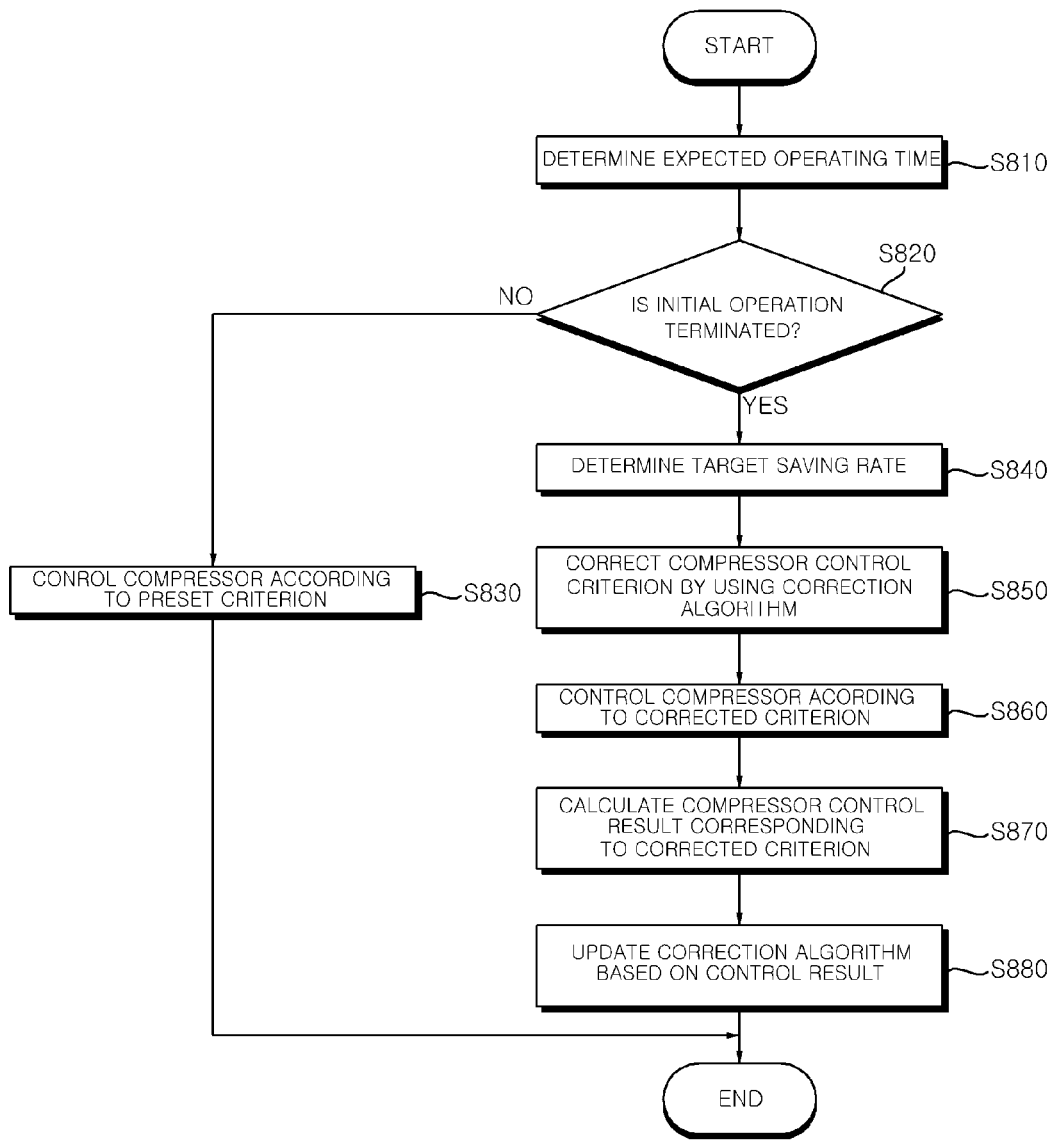

Referring to FIG. 8, in S810, the air conditioner 100 may determine a time (hereinafter, referred to as an expected operating time) expected for the air conditioner 100 to be driven during a specific unit time.

The air conditioner 100 may store, in a storage 330, a database on a time during which the air conditioner 100 has operated. In this case, whenever a unit time elapses, the air conditioner 100 may add, to a database, data on a time during which the air conditioner 100 has operated in the corresponding unit time. The air conditioner 100 may calculate an expected operating time of a specific unit time by using a database on a time during which the air conditioner 100 has operated and by using a triple exponential smoothing method corresponding to Equation 2 described above. In this case, the air conditioner 100 may perform cross-validation in which some of data on a time during which the air conditioner 100 has previously operated are used as training data by changing $\alpha$, $\beta$ and/or $\gamma$ on a 0.1 unit basis, while the remaining are used as test data. In this case, $\alpha$, $\beta$, and $\gamma$ with a smallest error may be used to calculate an expected operating time of a specific unit time according to a result of the cross-validation.

In S820, the air conditioner 100 may determine whether an initial operation is terminated. Here, the initial operation may refer to an operation performed for a preset time from a point in time when the air conditioner 100 starts operating in a specific unit time.

In S830, when the initial operation is not completed, the air conditioner 100 may operate according to a preset control criterion for controlling a compressor 110. Based on a difference between a target temperature set by a user and an indoor temperature detected by an indoor temperature sensor, a target value of compressor low pressure for refrigerant flowing into the compressor 110 (hereinafter, referred to as a target low pressure) may be determined. In this case, the air conditioner 100 may control an operating frequency of the compressor 110 so that a difference between a current compressor low pressure and the target low pressure is reduced.

In S840, the air conditioner 100 may determine a target saving rate for a specific unit time when the initial operation is terminated. Here, the target saving rate may refer to a ratio of a power quantity required to be reduced to a power quantity used for the specific unit time. For example, the target saving rate may correspond to a value obtained by dividing a difference between the power quantity used for the specific unit time and the target power quantity by the power quantity used for the specific unit time.

Figure 11A:
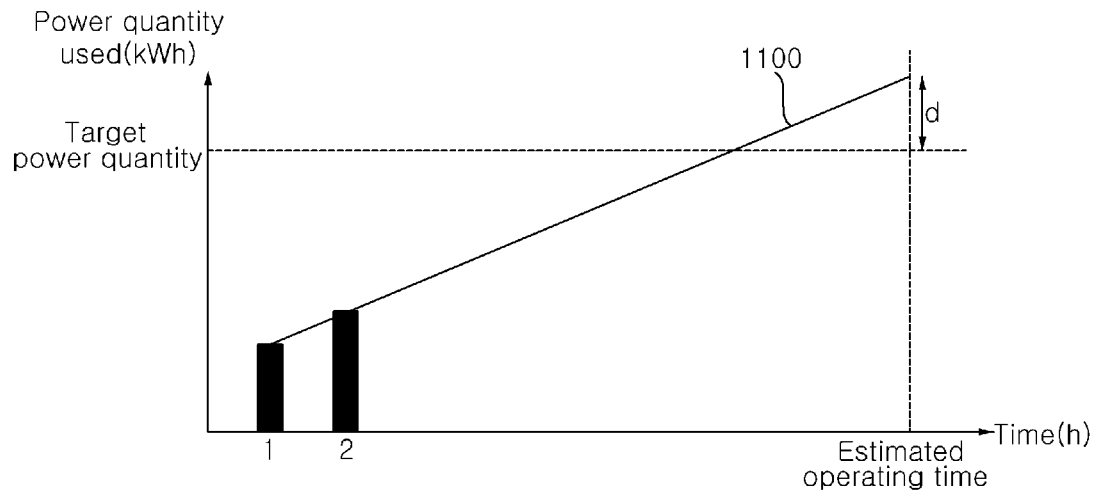

Referring to FIG. 11A, when the initial operation is terminated, the air conditioner 100 may check a power quantity used in the initial operation. For example, when a preset time for performing the initial operation is 2 hours, the air conditioner 100 may accumulate a used power quantity every hour, which is a predetermined period.

The air conditioner 100 may calculate a power quantity 1100 expected to be used until an expected operating time elapses, by using a power quantity accumulated every predetermined period and an expected operating time. In addition, the air conditioner 100 may calculate a difference (d) between a total power quantity at a time of elapse of the expected operating time and a target power quantity as a target power quantity required to be reduced, and may calculate a target saving rate by dividing the target power quantity to be reduced by a total power quantity accumulated until the time of arrival of the expected operating time.

In S850, the air conditioner 100 may correct a control criterion for controlling the compressor 110 by using a correction algorithm. For example, the air conditioner 100 may use the correction algorithm to correct a target saving rate, a target low pressure at a current point in time when an initial operation is terminated, an operating rate at the current point in time, and/or a corrected target low pressure corresponding to an outdoor temperature at the current point in time. In this case, the correction algorithm may include a k-nearest neighbor (k-NN) algorithm. Here, the k-NN algorithm may refer to an algorithm for determining a density of each region by extracting and grouping k pieces of data closest to a specific point. In addition, a database used for the k-NN algorithm (hereinafter, a database for correction) may be stored in the storage 330 of the air conditioner 100.

Meanwhile, when an estimated power quantity for a specific unit time and/or a total power quantity at a time of arrival of an expected operating time exceeds a target power quantity for a specific unit time, the air conditioner 100 may correct the control criterion for controlling the control of 110 by using a correction algorithm.

In S860, the air conditioner 100 may control the compressor 110 according to the corrected control criterion. For example, the air conditioner 100 may control an operating frequency of the compressor 110 so that a difference between the current compressor low pressure and the corrected target low pressure is reduced.

In S870, the air conditioner 100 may calculate a result of controlling the compressor 110 according to the corrected control criterion.

Figure 11B:
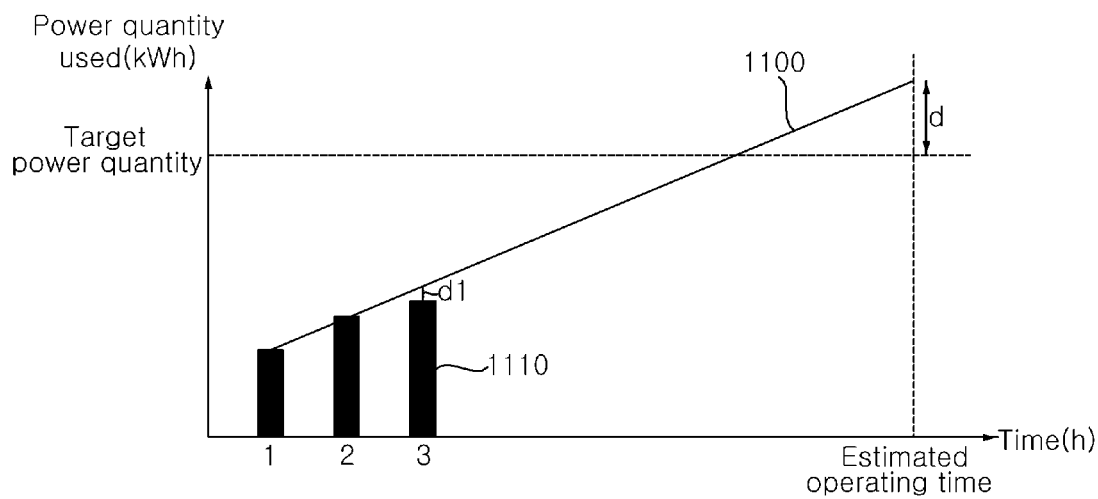

Referring to FIG. 11B, the air conditioner 100 may check a power quantity used for a predetermined time during which an operation is performed according to the corrected control criterion. For example, the air conditioner 100 may check a sum of a power quantity used for two hours during which an initial operation is performed and a power quantity used for one hour according to the corrected control criterion after the initial operation is completed.

The air conditioner 100 may calculate a difference d1 between a power quantity 1010 accumulated for three hours since the initial operation and a power quantity expected to be used for three hours in a power quantity 1100 expected to be used until an elapse of an expected operating time. In this case, the air conditioner 100 may determine a value obtained by dividing the calculated difference d1 by the power quantity expected to be used for three hours as a corrected saving rate.

In S880, the air conditioner 100 may update the correction algorithm based on a result of controlling the compressor 110 according to the corrected control criterion. For example, the air conditioner 100 may update, based on the corrected saving rate, the correction database used for the correction of the control criterion.

For example, the air conditioner 100 may store, in a database for correction, data including the corrected saving rate, the target low pressure at a time when a correction for the control criterion is performed, the operating rate, the outdoor temperature, and/or the corrected target low pressure.

For example, the air conditioner 100 may change the target low pressure of data used for correction of the control criterion among data included in the database for correction. In this case, when a difference between a target saving rate included in the corresponding data is equal to or greater than a first criterion (for example, 5%), the air conditioner 100 may increase a target low pressure included in the corresponding data by a predetermined value (for example, 10 hPa), and when the difference is less than a second criterion (for example, −5%), the air conditioner 100 may decrease the target low pressure included in the corresponding data by a predetermined value (for example, 10 hPa).

Figure 12:
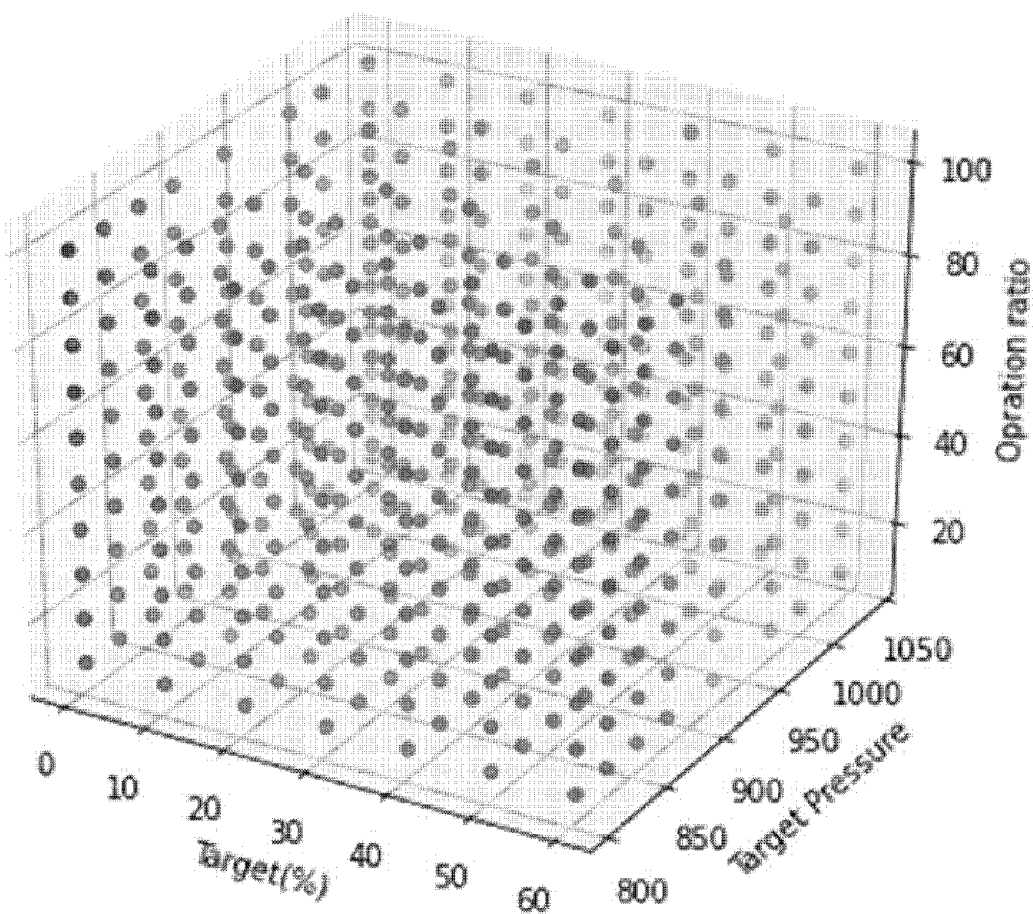

Referring to FIG. 12, it can be seen an example of distribution of data included in a database for correction, the data which is accumulated as the air conditioner 100 repeatedly updates a database for correction. In this case, the data included in the database for correction may be distributed according to an operating rate, a target low pressure, and a target saving rate.

Referring back to FIG. 5, in S560, the air conditioner 100 may determine whether an operation is terminated.

In S570, when the operation is not terminated, the air conditioner 100 may determine whether a point in time to update a target power quantity for a unit time arrives. For example, when a unit time of an entire period is one day, the point in time to update the target power quantity for the unit time may be set to midnight every day.

When the point in time to update a target power quantity for a unit time does not arrive, the air conditioner 100 may continue operating according to a predetermined target power quantity for a specific unit time.

In S580, when the point in time to update a target power quantity for the unit time arrives, the air conditioner 100 may update a database in which data on a power quantity used per unit time are accumulated. For example, when the point in time to update a target power quantity for a unit time arrives, the air conditioner 100 may add, to the database, a power quantity used for a specific unit time in consideration of a date and a time, both of which correspond to the specific unit time.

As described above, according to various embodiments of the present disclosure, by determining a target power quantity on the basis of a unit time and/or a section included in an entire period, it is possible to limit a power quantity used for the entire period below a target value while providing a comfortable indoor environment to the user as much as possible.

In addition, according to various embodiments of the present disclosure, it is possible to update a target power quantity on the basis of a unit time and/or section in consideration of a history of power quantities used by the air conditioner 100, thereby more surely limiting a power quantity used for the entire period below the target power quantity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous.

In addition, although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
an outdoor unit having therein a compressor that compresses a refrigerant;
at least one indoor unit;
a storage configured to store a database on a power quantity used by the air conditioner; and
a controller, wherein the controller is configured to:
based on data accumulated in the database over a predetermined period of time, calculate an estimated per-section power quantity expected to be used by the air conditioner in each of sections included in an entire period;

determine a target power quantity for each of the sections, which is a maximum power quantity available for each of the sections, according to a ratio corresponding to the estimated per-section power quantity, wherein a sum of the target power quantity for each of the sections corresponds to a preset maximum power quantity for the entire period;

based on the data accumulated in the database, calculate an estimated per-unit-time power quantity expected to be used by the air conditioner in each of unit times included in a specific section among the sections;

determine a target power quantity for each of the unit times, which is a maximum power quantity available for each of the unit times, according to a ratio corresponding to the estimated per-unit-time power quantity, wherein a sum of the target power quantity for each of the unit times corresponds to the target power quantity for the specific section;

control the compressor for a specific unit time based on the target power quantity for the specific unit time; and in response to arrival of a point in time to update the target power quantity for the specific unit time, add, to the database, the power quantity used by the air conditioner for the specific unit time.

2. The air conditioner of claim 1, wherein the controller is configured to:

calculate the estimated per-section power quantity by using a double exponential smoothing method; and calculate the estimated per-unit-time power quantity by using a triple exponential smoothing method.

3. The air conditioner of claim 1, wherein the controller is configured to:

in a case in which the specific unit time is a first unit time of the specific section and not a first unit time of the entire period, calculate the estimated power quantity for the specific section among the plurality of sections and the estimated power quantity for a section subsequent to the specific section; and re-determine the target power quantity with respect to the specific section in consideration of a power quantity used for the section prior to the specific section among the plurality of sections.

4. The air conditioner of claim 1, wherein the controller is configured to:

in a case in which the specific unit time is neither a first unit time of the specific section nor a first unit time of the entire period, calculate the estimated power quantity for the specific unit time among the unit times included in the specific section and for a unit time subsequent to the specific unit time; and re-determine the target power quantity for the specific unit time in consideration of a power quantity used in a unit time prior to the specific unit time among the unit times included in the specific section.

5. The air conditioner of claim 1, wherein the controller is configured to:

based on a saving rate corresponding to a difference between the estimated power quantity and the target power quantity for the specific unit time, correct a preset control criterion for controlling the compressor; and control the compressor according to the corrected control criterion.

6. The air conditioner of claim 5, wherein the controller is configured to correct the preset control criterion as a control criterion corresponding to the saving rate by using a correction algorithm previously learned through machine learning.

7. The air conditioner of claim 6, wherein the correction algorithm comprises a k-nearest neighbor (k-NN) algorithm.

8. The air conditioner of claim 6, wherein the storage further stores a database on an operating time during which the air conditioner has operated, and wherein the controller is configured to:

based on the database on the operating time, calculate the operating time corresponding to the specific unit time; and update the correction algorithm based on a difference between the power quantity used by the air conditioner while controlling the compressor according to the corrected control criterion and the power quantity calculated based on the operating time.

9. The air conditioner of claim 8, wherein the controller is configured to:

control the compressor according to the preset control criterion for a preset initial time;

based on a power quantity used by the air conditioner for the initial time and the operating time, determine whether the estimated power quantity for the specific unit time exceeds a target power quantity for the specific unit time; and correct the preset control criterion when the estimated power quantity for the specific unit time exceeds the target power quantity for the specific unit time.

10. An operation method of an air conditioner, the method comprising:

based on data accumulated in a database on a power quantity used by the air conditioner over a predetermined period of time, calculating an estimated per-section power quantity expected to be used by the air conditioner in each of sections included in an entire period;

determine a target power quantity for each of the sections, which is a maximum power quantity available for each of the sections, according to a ratio corresponding to the estimated per-section power quantity, wherein a sum of the target power quantity for each of the sections corresponds to a preset maximum power quantity for the entire period;

based on the data accumulated in the database, calculate an estimated per-unit-time power quantity expected to be used by the air conditioner in each of unit times included in a specific section among the sections;

determine a target power quantity for each of the unit times, which is a maximum power quantity available for each of the unit times, according to a ratio corresponding to the estimated per-unit-time power quantity wherein a sum of the target power quantity for each of the unit times corresponds to the target power quantity for the specific section;

controlling the compressor for a specific unit time based on the target power quantity for the specific unit time; and in response to arrival of a point in time to update the target power quantity for the specific unit time, adding, to the database, the power quantity used by the air conditioner for the specific unit time.

11. The method of claim 10, wherein the calculating of the estimated per-unit-time power quantity comprises calculating the estimated per-unit-time power quantity by using a triple exponential smoothing method, and wherein the calculating of the estimated per-section power quantity comprises calculating the estimated per-section power quantity by using a double exponential smoothing method.

12. The method of claim 10, wherein in a case in which the specific unit time is a first unit time of the specific section but not a first unit time of the entire period, the calculating of the estimated per-section power quantity comprises calculating the estimated power quantity for the specific section among the plurality of sections and for a section subsequent to the specific section, and the determining of the target power quantity for the specific unit time comprises re-determining the target power quantity for the specific section in consideration of the power quantity used for a section prior to the specific section among the plurality of sections.

13. The method of claim 10, wherein in a case in which the specific unit time is neither a first unit time of the specific section nor a first unit time of the entire period, the calculating of the estimated per-unit-time power quantity comprises calculating the estimated power quantity for the specific unit time among unit times included in the specific section and for a unit time subsequent to the specific unit time, and the determining of the target power quantity for the specific unit time comprises re-determining the target power quantity for the specific unit time in consideration of the power quantity used for a unit time prior to the specific unit time among the unit times included in the specific unit time.

14. The method of claim 10, wherein the controlling of the compressor comprises:
  correcting a preset control criterion for controlling the compressor based on a saving rate corresponding to a difference between the estimated power quantity and the target power quantity for the specific unit time; and
  controlling the compressor according to the corrected control criterion.

15. The method of claim 14, wherein the correcting of the control criterion comprise correcting the preset control criterion as a control criterion corresponding to the saving rate by using a correction algorithm previously learned through machine learning.

16. The method of claim 15, wherein the correction algorithm comprises a k-nearest neighbor (k-NN) algorithm.

17. The method of claim 15, wherein the controlling of the compressor comprises:
  based on a database on an operating time during which the air conditioner has operated, calculating an operating time corresponding to the specific unit time; and
  updating the correction algorithm based on a difference between the power quantity used by the air conditioner while controlling the compressor according to the corrected control criterion and a power quantity calculated based on the operating time.

18. The method of claim 17, wherein the correcting of the preset control criterion comprises:
  controlling the compressor according to the preset control criterion for a preset initial time;
  based on a power quantity used by the air conditioner for the initial time and the operating time, determining whether the estimated power quantity for the specific unit time exceeds a target power quantity for the specific unit time; and
  correcting the preset control criterion when the estimated power quantity for the specific unit time exceeds the target power quantity for the specific unit time.

* * * * *